US009848365B2

(12) United States Patent
Graffagnino et al.

(10) Patent No.: US 9,848,365 B2
(45) Date of Patent: Dec. 19, 2017

(54) DYNAMIC CONFIGURATION OF MOBILE NETWORK ENTITY IN A MOBILE MOBILE-WIRELESS NETWORK (MMWN)

(71) Applicant: Oceus Networks, Inc., Reston, VA (US)

(72) Inventors: Vincent Charles Graffagnino, Prosper, TX (US); Vincent Nathan Home, Frisco, TX (US); Dennis Paul Niermann, Richardson, TX (US); Steven Michael McCutchen, Southern Pines, TX (US)

(73) Assignee: OCEUS NETWORKS, INC., Reston, VA (US)

( * ) Notice: Subject to any disclaimer, the term of this patent is extended or adjusted under 35 U.S.C. 154(b) by 357 days.

(21) Appl. No.: 14/730,391

(22) Filed: Jun. 4, 2015

(65) Prior Publication Data

US 2016/0360432 A1 Dec. 8, 2016

(51) Int. Cl.
| | | |
|---|---|---|
| *H04W 36/14* | (2009.01) | |
| *H04W 24/02* | (2009.01) | |
| *H04W 64/00* | (2009.01) | |
| *H04W 84/04* | (2009.01) | |
| *H04W 88/08* | (2009.01) | |

(52) U.S. Cl.
CPC .......... *H04W 36/14* (2013.01); *H04W 24/02* (2013.01); *H04W 64/003* (2013.01); *H04W 84/042* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2008/0267114 A1* | 10/2008 | Mukherjee ............ | H04L 63/107 370/315 |
| 2013/0040682 A1* | 2/2013 | Chang ................... | H01Q 1/243 455/517 |

(Continued)

OTHER PUBLICATIONS

"Lte High capacity event parameters" Rajesh Kumar, Sep. 15, 2014, pages, URL=http://www.slideserve.com/karsen/lte-high-capacity-event-parameters.

(Continued)

*Primary Examiner* — Jeffrey M Rutkowski
*Assistant Examiner* — Andre Tacdiran
(74) *Attorney, Agent, or Firm* — Potomac Law Group, PLLC; Charles B. Lobsenz; Brian H. Buck

(57) ABSTRACT

A method of dynamically configuring a first mobile network entity (that is included in a first mobile mobile-wireless network (MMWN)) includes: recognizing that one or more of the following conditions; and adjusting one or more aspects which affect how the first mobile network entity performs cellular-data communication according to the one or more satisfied conditions, respectively. Such conditions include: a change in location of the first mobile network entity; a change in location of at least one other mobile network entity that (1) has neighbor-status of yes relative to the first mobile network entity and (2) is included within a corresponding at least one other MMWN, respectively; and a change in neighbor-status of at least one other mobile network entity that is included within at least one other MMWN, respectively.

26 Claims, 16 Drawing Sheets

(56) References Cited

U.S. PATENT DOCUMENTS

| | | | |
|---|---|---|---|
| 2013/0102313 A1* | 4/2013 | Tinnakornsrisuphap | H04W 36/22 455/436 |
| 2013/0235746 A1* | 9/2013 | Patel | H04W 72/0453 370/252 |
| 2013/0250882 A1* | 9/2013 | Dinan | H04W 72/0426 370/329 |
| 2015/0173111 A1* | 6/2015 | Agarwal | H04W 8/04 370/329 |
| 2016/0057633 A1* | 2/2016 | Eskelinen | H04W 16/28 370/252 |
| 2016/0157134 A1* | 6/2016 | Kordianowski | H04W 4/08 455/518 |
| 2016/0234739 A1* | 8/2016 | Puddle | H04W 36/0055 |
| 2016/0242155 A1* | 8/2016 | Xu | H04W 52/50 |

OTHER PUBLICATIONS

"LTE Quick Reference, EPS Bearer", www.sharetechnote.com, Mar. 18, 2015, 3 pages, URL=https://web.archive.org/web/20150318193319/http://sharetechnote.com/html/Handbook_LTE_EPS_Bearer.html.

"What is EPS Bearer in LTE?," www.teletopix.org, Feb. 27, 2012, URL=http://www.teletopix.org/4g-lte/what-is-eps-bearer-in-lte/.

"Introduction to Evolved Packet Core," Strategic White Paper, Alcatel-Lucent, 2009 12 pages, URL=https://www.google.com/url?sa=t&rct=j&q=&esrcr=s&source=web&cd=2&cad=rja&uact=8&ved=0CCsQFjAB&url=http%3A%2F%2Fwww3.alcatel-lucent.com%2Fwps%2FDocumentStreamerServiet%3FLMSG_CABINET%3DDocs_and_Resource_Ctr%26LMSG_CONTENT_FILE%3DWhite_Papers%2FHR_EPC_Platforms_wp_0409.pdf&ei=QceeVaCPPIMPToAT7n6-WwBg&usg=AFQjCNEspYwA6fdZgvUu-oUUEXtmBDQK1w&sig2=It6-DThuFOrLMDHeBTgX0g&bvm=bv.96952980,d. b2w.

"RF Path Loss & Transmission Distance Calculations," Walter Debus, Technical Memorandum of Axonn, LLC, Aug. 4, 2006, Aug. 4, 2006, 13 pages, URL=http://common.globalstar.com/.

"Introduction to Evolved Packet Core (EPC): EPC Elements, protocols and procedures," Kamakshi Sridhar, PhD, Aug. 2012, http://www.cvt-dallas.org/aug12-sridhar.pdf.

"LTE E2E Field Network Performance—Definitions of Key Performance Indicators," DN0951948, Issue 01B, Approval Date Jun. 23, 2010, URL=nashville.dyndns.org:800/YourFreeLibrary/_lte/KPI/ref_kpi.pdf.

"Next Generation Mobile Networks Use Cases related to Self Organising Network, Overall Description," The NGMN Alliance, May 31, 2007, 18 pages, URL=http://www.ngmn.org/uploads/media/NGMN_Use_Cases_related_to_Self_Organizing_Network_Overall_Description.pdf.

"QoS SIG Presentation, Summary of Qos Requirements," Dr. Parag Pruthi et al., Sep. 27, 2011{-} 29, 80 pages, URL=http://www.gisfi.org/wg_documents/GISFI_SeON_201109145.pdf.

"LTE Parameters," www.cprogramdevelop.com, Sep. 24, 2014, 20 pages, URL=http://www.cprogramdevelop.com/586516/.

Beamforming in LTE, www.teletopix.org, Dec. 2011, 2 pages, URL=http://www.teletopix.org/4g-lte/beamforming-in-lte/.

"LTE; Evolved Universal Terrestrial Radio Access (E-UTRA); Physical layer; Measurements (3GPP TS 36.214 version 10.1.0 Release 10)," ETSI TS 136 214 V10.1.0 (Apr. 2011), 15 pages, URL=http://www.etsi.org/deliver/etsi_TS/136200_136299/136214/10.01.00_60/ts_136214v100100p.pdf.

"LTE Physical Layer Measurements of RSRP and RSRQ," Mar. 14, 2011, 2 pages, The 3G4G Blog, URL=http://blog.3g4g.co.uk/2011/03/lte-physical-layer-measurements-of-rsrp.html.

* cited by examiner

US 9,848,365 B2

DYNAMIC CONFIGURATION OF MOBILE NETWORK ENTITY IN A MOBILE MOBILE-WIRELESS NETWORK (MMWN)

FIELD OF THE DISCLOSURE

Embodiments of the present invention relate to methods of operating a mobile network entity, and more particularly to methods of dynamically configuring a mobile network entity and to corresponding dynamically configurable mobile network entities.

BACKGROUND

In a wireless communication network, nodes are connected wirelessly to the network. In some wireless networks, the wirelessly-connected nodes are themselves physically mobile, e.g., the handsets in a conventional mobile-telephony network. While user equipment (UE), e.g., mobile telephones, attached to a conventional mobile-telephony network are themselves physically mobile, their communication is supported by physically stationary infrastructure, namely stationary base stations in different locations that communicate with a remote, stationary mobile-telephone-switching office (MTSO). A given one of the UEs can move from the coverage area of a first stationary base station into the coverage area of a second stationary base station. To facilitate the handoff of a given UE from the first stationary base station to the second stationary base station, some received signal strength data are collected by and received from the given UE by the first stationary base station.

Many locations throughout the world lack such physically-stationary network infrastructures. Reasons why such physically-stationary network infrastructures might be lacking at a given location include: the sovereign authority and/or private companies lack adequate financial resources to cover the requisite capital investment; the sovereign authority and/or private companies might not be able to justify the requisite capital investment in view of the population density being too low, the location being too geographically remote; the location's topography being too difficult; the location's environment being too harsh; etc. Alternatively, a given location might have physically-stationary network infrastructures that have been damaged by a natural disaster or war but which have yet to be repaired because too little time has elapsed since the disaster occurred or because of the ongoing risks of being located in a live war zone, respectively.

Communications in such environments can be improved by using a mobile mobile-wireless network (MMWN). Aside from the UEs, in an MMWN, all of the components of a typical cellular network can reside in one device (referred to herein as a network-in-a-box (NIB)). The NIB itself is mobile. The MMWN provides an example of a wireless network in which not only the wirelessly-connected nodes (UEs) themselves are physically mobile, but the infrastructure that supports their communication (namely, the NIB) also is physically mobile.

The NIB is self-contained in that it does not need to communicate with other NIBs or an MTSO to provide complete cellular network functionality to instances of user equipment (UEs) within its area of coverage. One example of a commercially available NIB is the XIPHOS™ available from OCEUS NETWORKS™.

As a NIB moves, the network coverage (that it provides) moves with it. To increase the range of coverage, multiple NIBs can be networked together to create a network of MMWNs (referred to herein as a NOM). Among other things, a first MMWN can perform handover operations when a UE moves from its coverage area to the coverage area of an adjacent MMWN within the NOM, and vice-versa. Furthermore, if an MMWN moves from one location to another, the NOM can allocate affected UEs between the moving MMWN and one or more adjacent MMWNs in the area.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of dynamically configuring a first mobile network entity that is included in a first mobile mobile-wireless network (MMWN), the method comprising: recognizing that one or more conditions have been satisfied; and adjusting one or more aspects which affect how the first mobile network entity performs cellular-data communication according to the one or more satisfied conditions, respectively. Such conditions include: a change in location of the first mobile network entity; a change in location of at least one other mobile network entity that (1) has neighbor-status of yes relative to the first mobile network entity and (2) is included within a corresponding at least one other MMWN, respectively; and a change in neighbor-status of at least one other mobile network entity that is included within at least one other MMWN, respectively.

Another aspect of the present invention provides a dynamically configurable first mobile network entity included in a first mobile mobile-wireless network (MMWN), the first mobile network entity comprising: a processor; and memory including program code. The processor is configured to execute the program code and thereby: recognize when one or more conditions have been satisfied; and adjust one or more aspects which affect how the first mobile network entity performs cellular-data communication according to the one or more satisfied conditions, respectively. Such conditions include: a change in location of the first mobile network entity; a change in location of at least one other mobile network entity that (1) has neighbor-status of yes relative to the first mobile network entity and (2) is included within a corresponding at least one other MMWN, respectively; and a change in neighbor-status of at least one other mobile network entity that is included within at least one other MMWN, respectively.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein:

FIGS. 2B-2J illustrate, in more detail, aspects of the method of FIG. 2A, according to embodiments of the present invention, respectively;

DETAILED DESCRIPTION

Figure 1A:
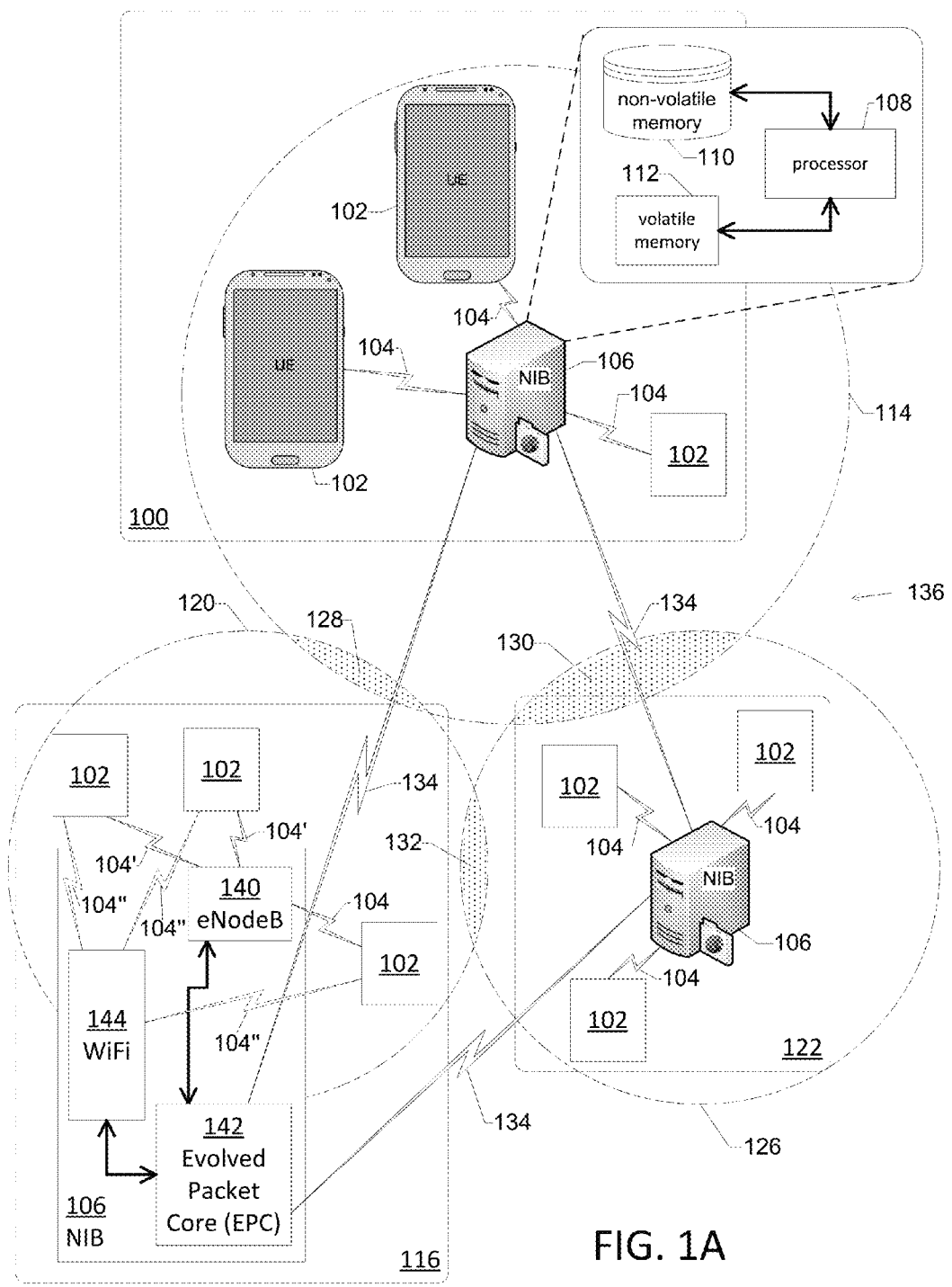
FIG. 1A is a block diagram of multiple instances of a mobile-wireless network (referred to herein as a MMWN) arranged in a network (referred to herein as a NOM), according to an embodiment of the present invention.

Embodiments of methods of dynamically configuring a mobile network entity and corresponding dynamically configurable mobile network entities will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing embodiments of the present invention, among other things, the inventors thereof:
were mindful that conventional techniques for configuring a stationary base station in a mobile telephony network have limited practical effectiveness when applied to configuring a first mobile network entity (as contrasted with one of more instances of user equipment (UE)) in a first mobile mobile-wireless network (MMWN) because the results of the conventional techniques can quickly become obsolete, e.g., because (A) the first mobile network entity has moved; (B) another mobile network entity has moved, the other mobile-network entity (1) having a neighbor-status relative to the first mobile network entity and (2) being included within another MMWN, (C) the neighbor-status of another mobile network entity has changed, the other mobile network entity being included within another MMWN, etc.;
recognized that at least some aspects which affect how a mobile network entity performs cellular-data communication are amenable to real-time adjustment;
recognized that at least some conditions (let's call them "location-based conditions") which (when satisfied make it appropriate to adjust the noted amenable-aspects) are dependent upon changes in the location of the first mobile network entity, changes in the locations of other mobile network entities, changes in the distances between the first mobile network entity and the other mobile network entities and/or changes in the locations of instances of user equipment serviced by the first mobile network entity;
recognized that peer data can be exchanged between mobile network entities of multiple mobile wireless networks, respectively, and that such data can analyzed to determine if such location-based conditions have been satisfied; and
recognized that a mobile network entity which can dynamically/adaptively adjust the noted amenable-aspects based on the noted location-based conditions can be advantageous, e.g., in terms of providing better performance despite the various noted changes in locations.

One or more embodiments of the present invention provide such a mobile network entity and a method of dynamically configuring the same.

FIG. 1A is a block diagram of multiple instances 100, 116 and 122 of a mobile mobile-wireless network (MMWN) arranged in a network 136 (referred to herein as a NOM), according to an embodiment of the present invention. For simplicity, only three instances (100, 116 and 122) of MMWN are illustrated in FIG. 1A; greater of fewer instances of MMWN are contemplated.

In FIG. 1A, each of MMWNs 100, 116 and 122 includes: instances of mobile user equipment (UE) 102; and one or more instances of a mobile network entity. Herein, examples of a mobile network entity are to be understood as including any of the physical and/or functional elements that typically are included in a mobile network. Also, a mobile network entity itself can include one or more other mobile network entities, i.e., a mobile network entity itself can represent a combination of mobile network entities. As a more particular example, for an LTE network, a mobile network entity can be a radio access node (eNodeB), an evolved packet core (EPC); other core functional network elements, e.g., an HSS (home subscriber server), and a PCRF (policy and charging rules function), transport network elements (e.g., routers, switches, etc.), service layer functional units, etc. Continuing the LTE example, a mobile network entity also can be one or more of nodes included in an EPC, e.g., an MME (mobile management entity); an SGW pag (serving gateway); a PGW (a packet data network gateway).

A circumstance in which one or more of such mobile network entities are collocated in an apparatus is referred to as a network-in-a-box (NIB). Accordingly, a NIB is an example of a mobile network entity which itself includes one or more other mobile network entities. Each of MMWNs 100, 116 and 122 in FIG. 1A further includes a NIB 106. Each of MMWNs 100, 116 and 122 is an example of a wireless network in which not only the wirelessly-connected nodes (instances of UE 102) themselves are physically mobile, but the infrastructure that supports their communication (namely, NIB 106) also is physically mobile. For example, each of MMWNs 100, 116 and 122 can be configured to perform, at least, cellular-data communication.

While (as noted above) NIB 106 itself is an example of a mobile network entity, it also represents a combination of multiple examples of mobile network entities. That is, among other things included therein, examples of mobile network entities that can comprise NIB 106 include one or more of the following: an LTE (Long Term Evolution) base station 140, e.g., an evolved node B (eNodeB); an evolved packet core (EPC) 142 (which itself can be described as a combination of mobile network entities); one or more other core functional network elements, e.g., an HSS (not illustrated), a PCRF (not illustrated), etc.; one or more transport network elements (not illustrate), e.g., a router (not illustrated), a switch (not illustrated), etc.; one or more service layer functional units (not illustrated); etc. Similarly, among other things included therein, examples of mobile network entities that can comprise EPC 142 include one or more of the following: an MME (not illustrated); an SGW (not illustrated); and a PGW (not illustrated). If handover is desired with a non-UMTS network, e.g., CDMA200, WiMAX, WiFi hotspot, etc.), then NIB 106 can be provided with additional mobile network entities including: an ePDG (evolved packet data gateway, not illustrated); and an ANDSF (Access Network Discovery and Selection Function, not illustrated). Each of NIB 106 and EPC 142 also includes: one or more instances of a processor 108; one or more instances of non-volatile memory 110; and one or more instances of volatile memory 112. Functional units of NIB 106 and EPC 142 can be implemented at least in part, e.g., as executable code stored in one or more of the noted (above) memories thereof and executed by one or more of the noted (above) processor units thereof, respectively.

Each NIB 106 further can include: an LTE modem (not illustrated) within eNodeB 140; and (optionally but typically) a WiFi interface 144 (including a WiFi modem, not illustrated). Via wireless communication sessions 104, instances of UE 102, communicate with instances of NIB 106, respectively. An instance of UE 102 can be any device that includes a wireless interface, e.g., an LTE modem (not illustrated), (optionally but typically) a WiFi modem (not illustrated), etc., by which to communicate with NIB 106 via a wireless communication session 104. For example, UE 102 can be a mobile phone (e.g., a smart mobile phone running the ANDROID™ operating system, a laptop/notebook computer, a tablet computer, a dedicated GPS (Global Positioning System) receiver, a smart sensor, etc.) Additionally, such LTE-modem-equipped devices further include computing components (not illustrated in FIG. 1A), e.g., one or more processor units, one or more communications buses, one or more memories, one or more interfaces (e.g., a man-machine interface), etc. Functional units of each instance of UE 102 can be implemented at least in part, e.g., as executable code stored in one or more of the noted (above) memories thereof and executed by one or more of the noted (above) processor units thereof, respectively.

A given instance of user-equipment-traffic (UE-traffic) includes substantially all data transferred at a given moment during a given instance of wireless communication session 104 between a given instance of user equipment and a first mobile network entity. Typically, but not necessarily, such traffic is handled via instances of a wireless cellular-data-communication session 104' involving one or more instances of eNodeB 140. Alternatively, conditions may arise in which, on balance, it is preferred that traffic of one or more instances of UE 102 is handled via instances of a wireless WiFi-data-communication session 104" involving one or more instances of WiFi interface 144. To indicate the alternative nature of instances of wireless WiFi-data-communication session 104n, the corresponding icons in FIG. 1A are illustrated in phantom lines.

For simplicity, areas of wireless communication coverage 114, 120 and 126 of the instances of NIB 106 in MMWNs 100, 116 and 122, respectively, are illustrated as circles. As a practical matter, coverage areas typically are not circular; instead coverage areas may be lobular, etc. As a first instance of NIB 106 moves, its corresponding coverage area may overlap with one or more other instances of NIB 106 in NOM 136. Examples of overlapping coverage areas are illustrated in FIG. 1A. Coverage areas 114 and 120 overlap in area 128. Coverage areas 114 and 126 overlap in area 130. And coverage areas 120 and 126 overlap in area 132.

Depending upon the extent of overlap between two adjacent MMWN-coverage areas, the two adjacent instances of MMWN may interfere with one another. Recalling that instances of NIB 106 are themselves mobile, it is a common and typically transitory (albeit not fleeting) for coverage areas of two adjacent instances of MMWN to interfere with each other, e.g., by substantially overlapping.

Figure 3A:
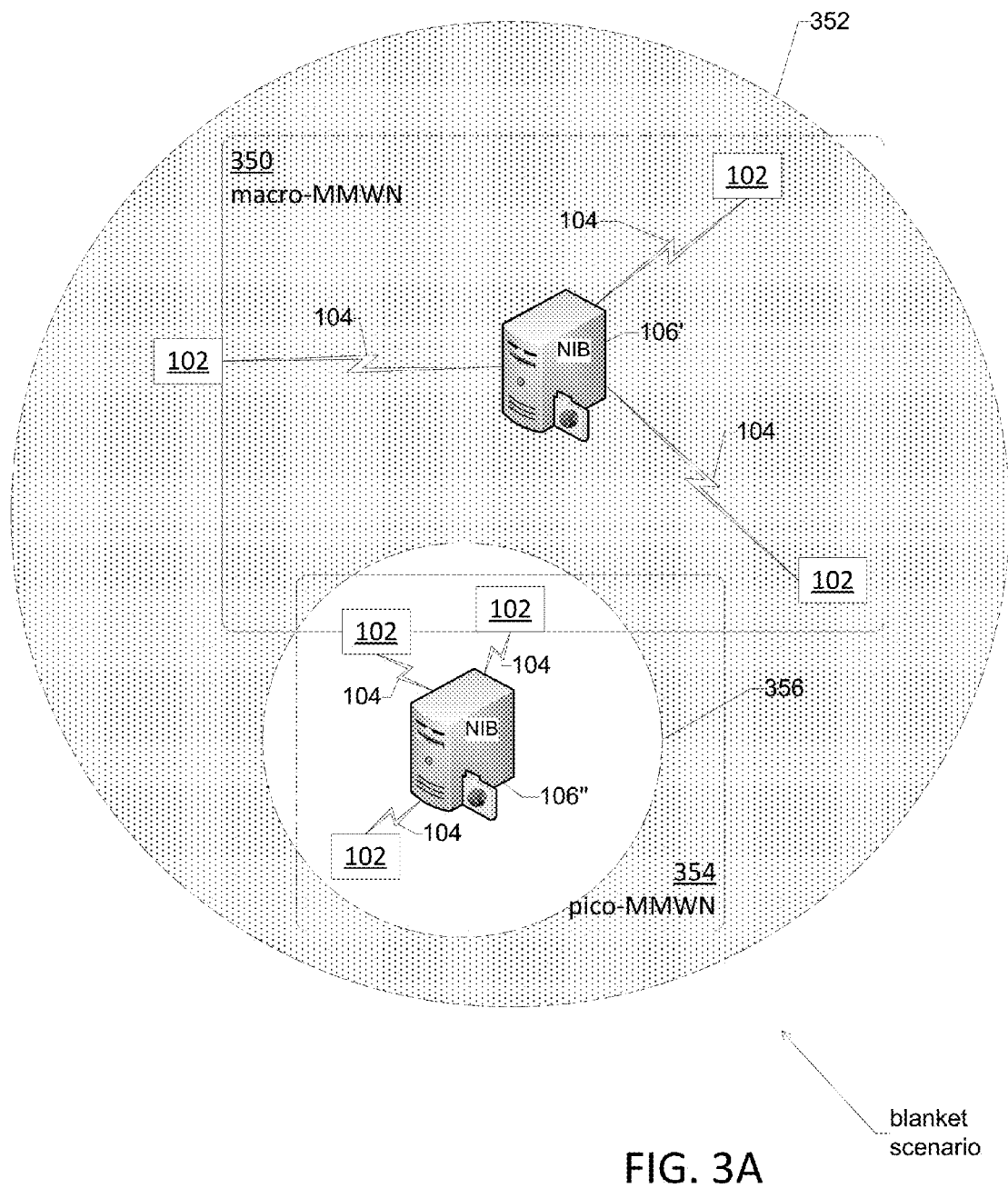
FIGS. 3A-3C illustrate scenarios in which coverage areas of two adjacent instances of MMWN interfere with each other, e.g., by substantially overlapping, with FIG. 3A illustrating the 'blanket' scenario, and with FIGS. 3B-3C illustrating the 'back-to-back' scenario.
Figure 3B:
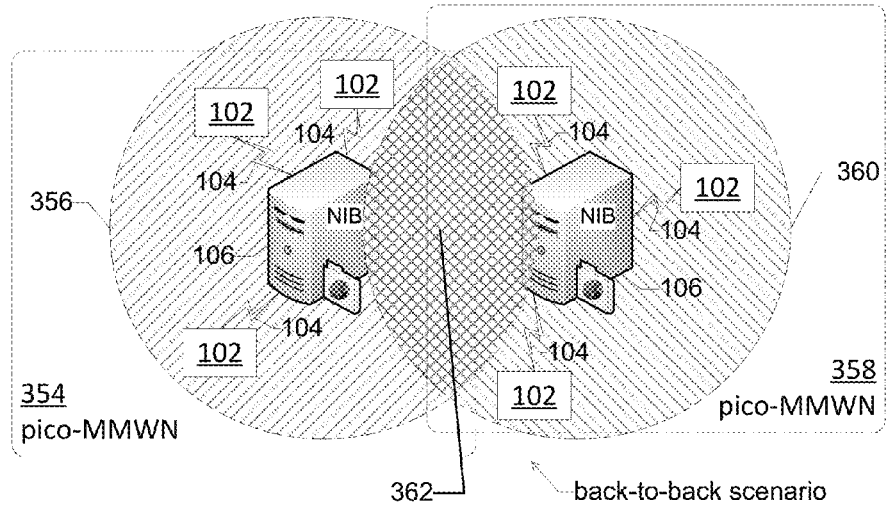
Figure 3C:
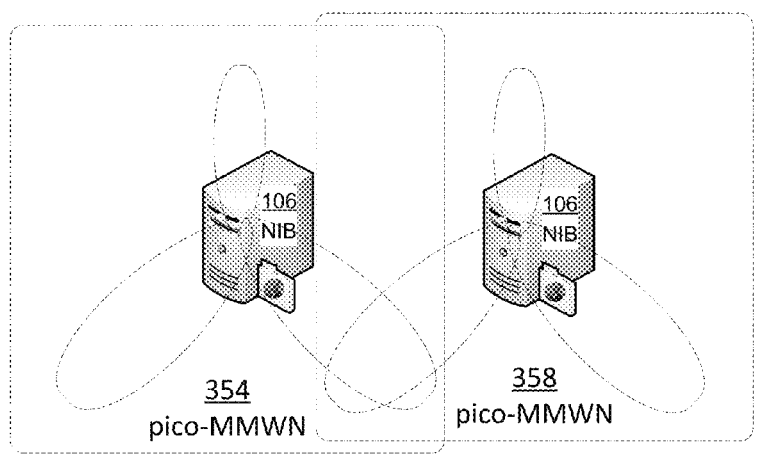

FIGS. 3A-3C illustrate scenarios in which coverage areas of two adjacent instances of MMWN interfere with each other, e.g., by substantially overlapping.

In FIG. 3A, for example, the 'blanket scenario' is illustrated. In FIG. 3A, there are two MMWNs 350 and 354 such that there are two NIBs, NIB 106' and NIB 106", respectively. Assume that NIB 106" is being used by a group of users, e.g., first-responders, with the group including, e.g., 9-43 users, and having one or more vehicles to transport the users. Let's refer to the group's MMWN 354 as a pico-MMWN having a coverage area 356. In the blanket scenario of FIG. 3A, the vehicle on which NIB 106" of the pico-MMWN has been driven into coverage area 352 of MMWN 350 (let's call MMWN 350 a macro-MMWN) having substantially more powerful NIB 106'. Coverage area 352 is substantially larger than coverage area 356 such that most (if not all) of coverage area 356 of pico-MMWN 354 is overlapped by coverage area 352 of macro-MMWN 350. As a consequence, pico-MMWN 354 interferes with macro-MMWN 350 and vice-versa.

The blanket scenario is an example of circumstances in which it would desirable in real-time to adjust one or more aspects which affect how one or both of the respective instances of NIB 106 performs cellular-data communication. Embodiments of the present application provide such adjustment by providing real-time methods of dynamically configuring a mobile network entity and corresponding real-time dynamically configurable mobile network entities.

Figure 3D:
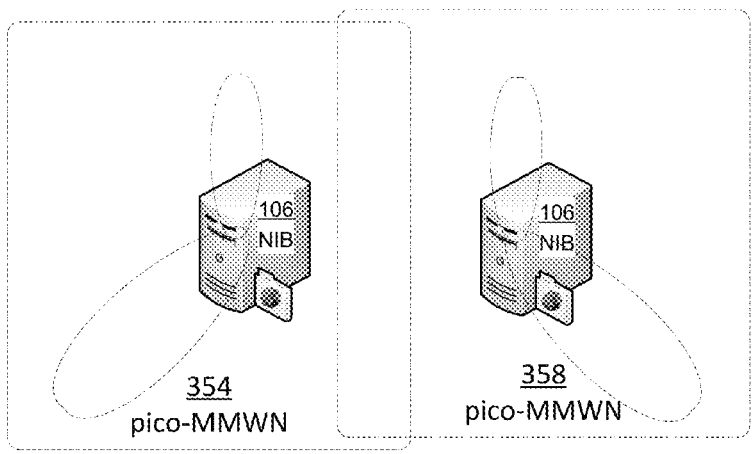
FIG. 3D is an example of a real-time adjust to one or more aspects which affect how one or both of respective instances of an NIB 106 can perform cellular-data communication, according to an embodiment of the present invention.

In FIGS. 3B-3D, for example, the 'back-to-back' scenario is illustrated. In FIG. 3B, there are two pico-MMWNs 354 and 358 each having a NIB 106. Assume that pico-MMWNs 354 and 358 are being used by two groups of users (each group numbering, e.g., 9-43 users), respectively, with each group having one or more vehicles to transport the users. In the back-to-back scenario of FIG. 3B, the two vehicles on which are being carried the two instances of NIB 106 could be parked next to one another such that pico-MMWNs 354 and 358 have a substantial area 362 in which their coverage areas 356 and 360 overlap, respectively. Consequently, the radiation patterns of pico-MMWNs 354 and 358 interfere with one another. FIG. 3C is a simplified version of FIG. 3B that illustrates how lobes in the radiation patterns of pico-MMWNs 354 and 358 overlap.

The back-to-back scenario is another example of circumstances in which it would desirable in real-time to adjust one or more aspects which affect how one or both of the respective instances of NIB 106 performs cellular-data communication. Embodiments of the present application provide such adjustment by providing real-time methods of dynamically configuring a mobile network entity and corresponding real-time dynamically configurable mobile network entities.

FIG. 3D is an example of a real-time adjustment to one or more aspects which affect how one or both of respective instances of NIB 106 can perform cellular-data communication, according to an embodiment of the present invention.

FIG. 3D is similar to FIG. 3C except that NIBs 106 of pico-MMWNs 354 and 358 have been controlled to change, e.g., at least substantially suppress, the lobes that overlapped in FIG. 3C, thereby reducing interference between the radiation patterns of pico-MMWNs 354 and 358.

Returning to the discussion of FIG. 1A, not only can an instance of NIB 106 wirelessly communicate with instances of UE 102, it can also wirelessly communicate with other instances of NIB 106. Accordingly, in FIG. 1A, instances of wireless communication session 134 are illustrated between NIB 106 of MMWN 100 and NIB 106 of MMWN 116, between NIB 106 of MMWN 100 and NIB 106 of MMWN 122, and between NIB 106 of MMWN 116 and NIB 106 of MMWN 122. An instance of wireless communication session 134 can be handled via microwave communication, LTE backhaul communication technologies, mesh networking, etc. Among other things, peer data can be exchanged between instances of NIB 106 via instances of wireless communication session 134, respectively.

Figure 1B:
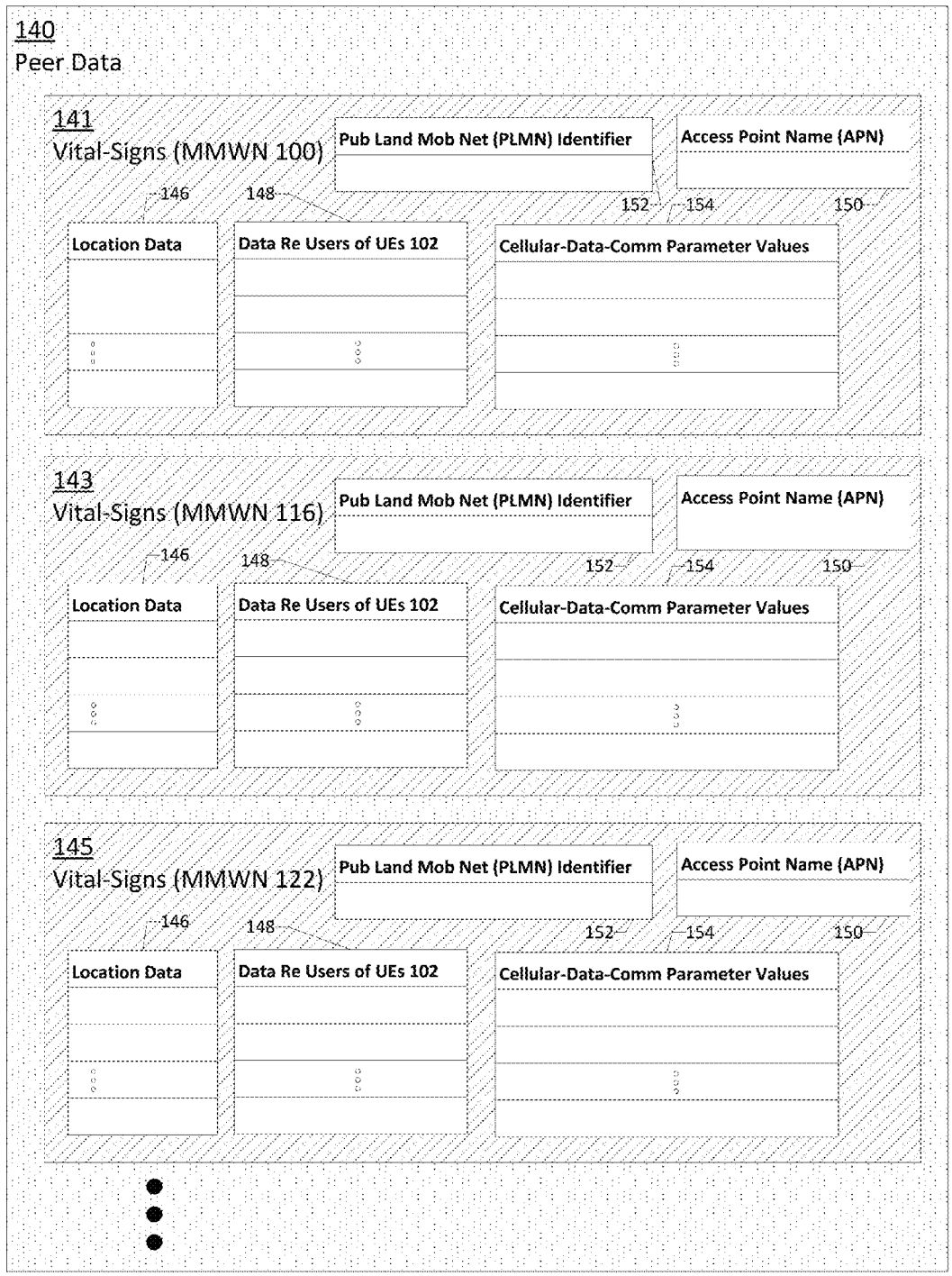
FIG. 1B is a block diagram illustrating an example of peer data, according to an embodiment of the present invention.

FIG. 1B is a block diagram illustrating an example of peer data 140, according to an embodiment of the present invention;

In FIG. 1B, peer data 140 includes data regarding the instances of MMWNs in NOM 136, e.g., MMWNs 100, 116 and 122. More specifically, peer data 140 includes a minimal set of data for each MMWN (let's adapt a term from the medical field and refer to the minimal set as the 'vital-signs' of a given MMWN). As such peer data 140 includes vital-signs 141 regarding MMWN 100, vital-signs 143 regarding MMWN 116, and vital-signs 145 regarding MMWN 122. Each of vital-signs 141, vital-signs 143 and vital-signs 145 includes: location data 146 corresponding to NIB 106; data 148 regarding users of instances of UE 102 being serviced by NIB 106; an access point name (APN) 150; a public land mobile network (PLMN) identifier 152; and cellular-data communication operation parameter values 154.

The exchange of peer data can be performed automatically by each instance of NIB 106 in NOM 136. Alternatively, for example, an operator of a given instance of NIB 106 can monitor the movement of trigger the given instance of NIB 106 to send an instance of its vital-signs to the other instances of MMWN, e.g., when the given instance of NIB 106 changes position by an amount that exceeds a threshold distance.

FIGS. 1C-1G are block diagrams illustrating NIB 106 with antenna systems, respectively, according to embodiments of the present invention, respectively. More particularly, relative to FIG. 1C, FIGS. 1D-1F illustrate mechanical down-tilting and/or electrical down-tilting.

In FIGS. 1C-1F, the antenna system includes an instance of an antenna 156, e.g., a multi-element array, and an instance of a mechanical adjuster 158. Antenna 156 can be, e.g., an omnidirectional antenna. Typically, NIB 106 will be provided with an antenna system that includes two or more antennas 156 and two or more corresponding mechanical adjusters 158, respectively, as illustrated in FIG. 1G. For simplicity, however, each of FIGS. 1C-1F only illustrates one instance of antenna 156 and one instance of mechanical adjuster 158.

Figure 1C:
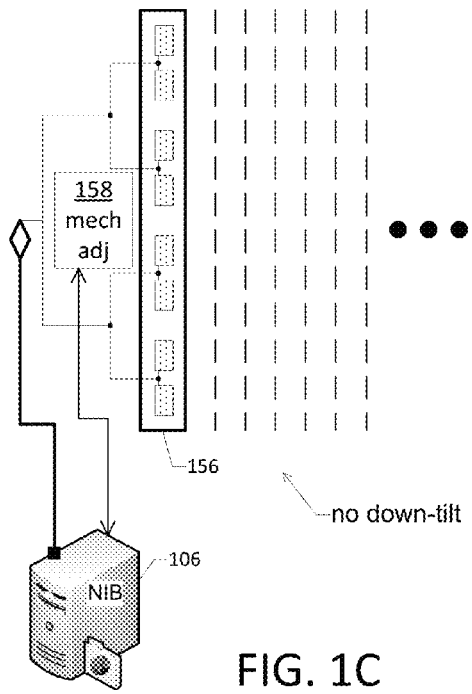
FIGS. 1C-1G are block diagrams illustrating NIB 106 with antenna systems, respectively, according to embodiments of the present invention, respectively, and more particularly, relative to FIG. 1C, FIGS. 1D-1F illustrate mechanical down-tilting and/or electrical down-tilting.

In FIG. 1C, relative to an imaginary horizontal reference plane, NIB 106 has controlled mechanical adjuster 158 to orient antenna 156 at an angle that is substantially perpendicular. It is assumed that NIB 106 has not manipulated the phases of the signals provided to the multiple elements of antenna 156, i.e., has not induced an electrical down-tilt in the radiation propagating from antenna 156. As such, radiation from antenna 156 in FIG. 1C is illustrated as propagating in a direction substantially parallel to the horizontal reference plane. In FIG. 1C, no down-tilt of the radiation pattern has been induced.

By contrast, in FIG. 1E, it is again assumed that NIB 106 has not induced an electrical down-tilt in the radiation propagating from antenna 156. Instead, NIB 106 has controlled mechanical adjuster 158 to orient antenna 156 at an angle substantially oblique to the horizontal reference plane. As such, radiation from antenna 156 in FIG. 1E is illustrated as propagating in a direction substantially oblique to the horizontal reference plane. In FIG. 1E, mechanical (but not electrical) down-tilt of the radiation pattern has been induced.

Figure 1D:
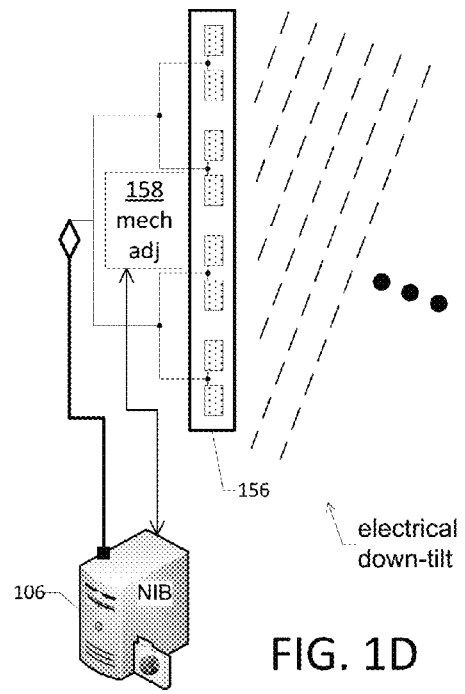
Figure 1E:
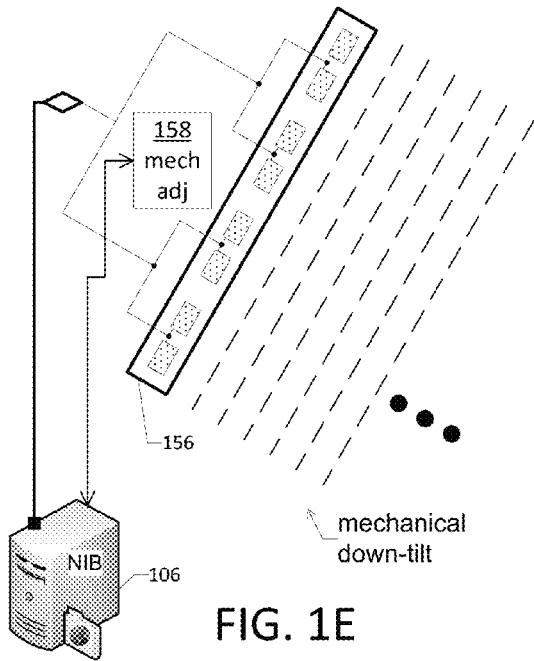

In FIG. 1D (as in FIG. 1C), relative to an imaginary horizontal reference plane, NIB 106 has controlled mechanical adjuster 158 to orient antenna 156 at an angle that is substantially perpendicular. As such, no mechanical down-tilt has been induced in the radiation propagating from antenna 156. Instead, NIB 106 has manipulated the phases of the signals provided to the multiple elements of antenna 156, i.e., has induced an electrical down-tilt in the radiation propagating from antenna 156. As such, radiation from antenna 156 in FIG. 1D is illustrated as propagating in a direction substantially oblique to the horizontal reference plane. In FIG. 1D, electrical (but not mechanical) down-tilt of the radiation pattern has been induced.

Figure 1F:
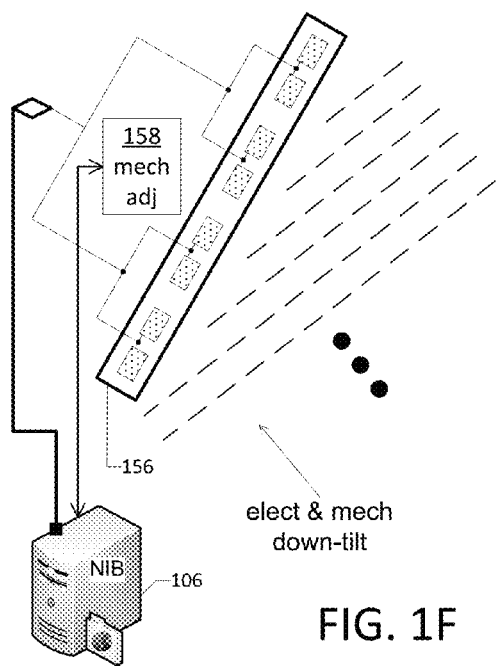
Figure 1G:
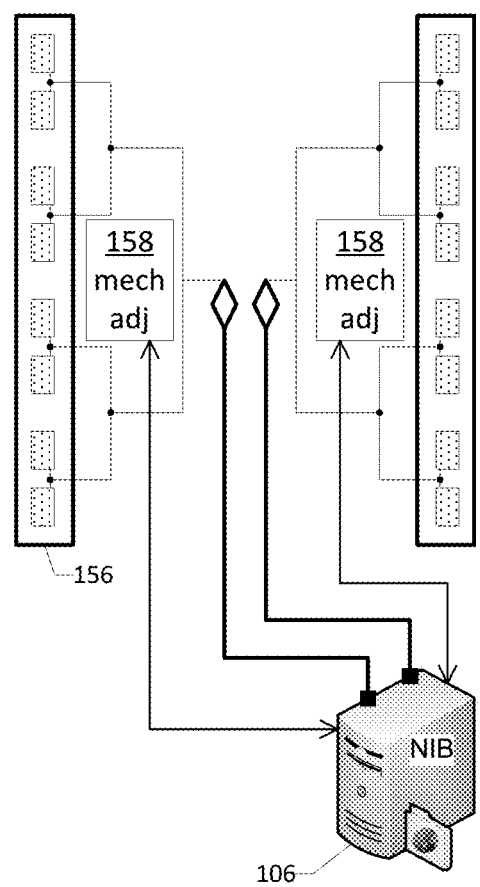

In FIG. 1F, both mechanical down-tilt and electrical down-tilt have been induced. As such, radiation from antenna 156 in FIG. 1F is illustrated as propagating in a direction substantially oblique to the horizontal reference plane. FIG. 1F can be described as a combination of FIGS. 1D-1E.

Figure 2A:
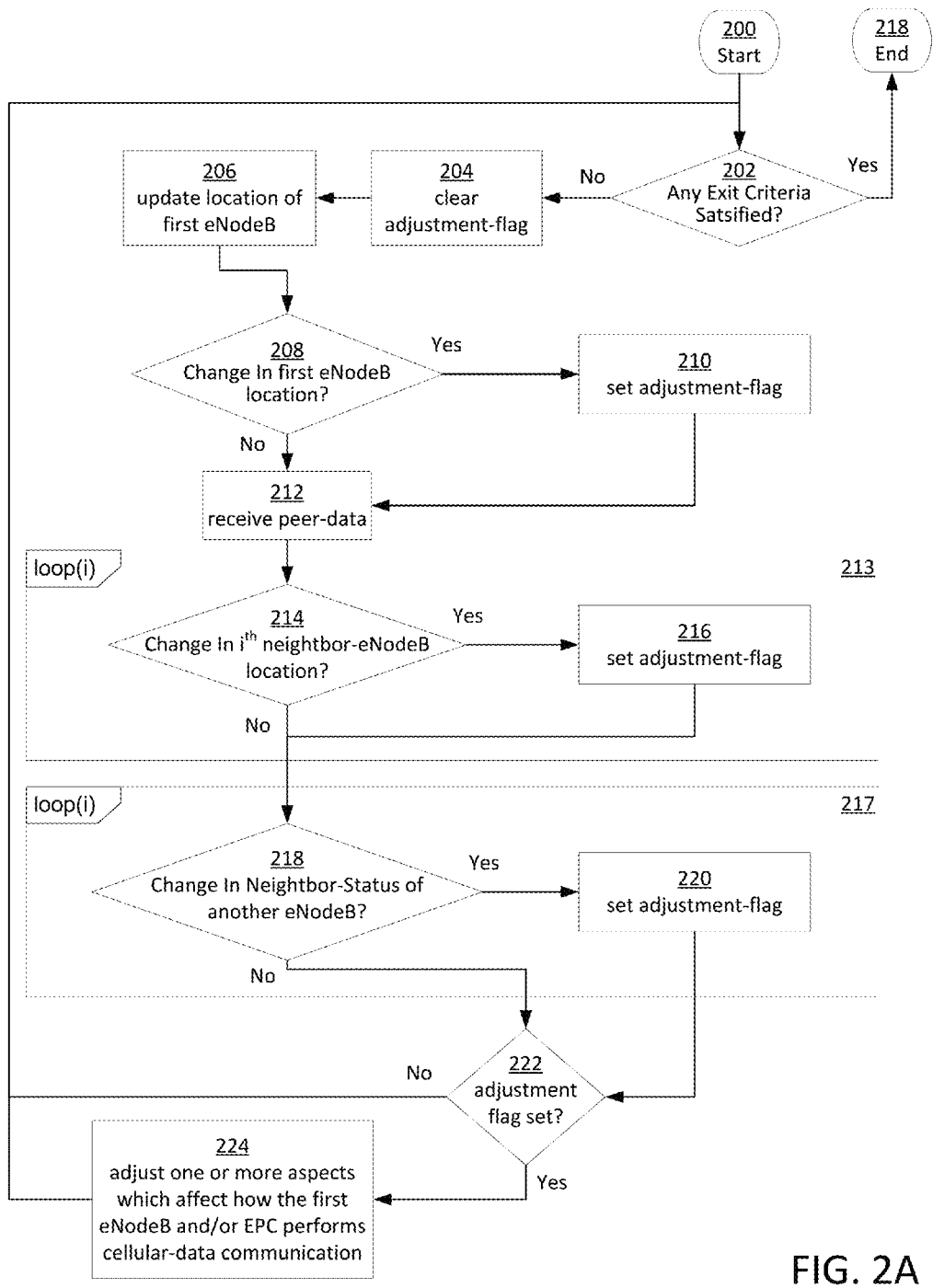
FIG. 2A is a flowchart illustrating a method of dynamically configuring a mobile network entity that is included in a MMWN, according to an embodiment of the present invention.

FIG. 2A is a flowchart illustrating a method of dynamically configuring a mobile network entity that is included in an MMWN, e.g., an instance of eNodeB 140 that is included in NIB 106 in the corresponding instance of an MMWN, e.g., 100, according to an embodiment of the present invention;

As noted, eNodeB can be implemented, at least in part, by processor 108 and memories 110-110. For example, the program code can be provided in memory 110 and/or memory 112, and processor 108 can be configured to execute the program code and thereby carry out the methods illustrated in FIGS. 2A-2J, respectively.

The flowchart of FIG. 2A, overall, can be regarded as a loop. As a general design consideration, no loop should be infinite, i.e., inescapable. Accordingly, flow in FIG. 2A starts at block 200 and proceeds to decision block 202, where processor 108 decides if any exit criteria have been satisfied. If the decision is yes (one or more of the exit criteria are satisfied), then flow proceeds to block 218 and ends. If the decision is no (none of the exit criteria has been satisfied), then flow proceeds to block 204.

At block 204, as preparation for iterating the loop, an adjustment-flag (e.g., stored in memory 112) is cleared. Flow proceeds from block 204 to block 206, where the location of eNodeB 140 in MMWN 100 is updated. Flow proceeds from block 206 to decision block 208, where processor 108 operates on the updated location information to determine if there has been a change in the location of eNodeB 140 in MMWN 100. The determination represented by decision block 208 is illustrated in more detail below in the context of FIG. 2B.

If the outcome of decision block 208 is yes (there has been a change in location of eNodeB 140 in MMWN 100), then flow proceeds to block 210, where the adjustment-flag is set.

From block 210, flow proceeds to block 212. If the outcome of decision block 208 is no (there has NOT been a change in location of eNodeB 140 in MMWN 100), then flow proceeds to block 212.

At block 212, peer-data, e.g., peer-data 140 (discussed above), is received. From block 212, flow proceeds to iterative loop 213, which iterates for through a range i={0, . . . , N−1}, where N is the number of neighbor mobile network entities. Within loop 213, flow proceeds to decision block 214, where processor 108 operates on the peer-data to determine if there has been a change in the location of the $i^{th}$ other mobile network entity that (1) has neighbor-status of yes relative to eNodeB 140 in MMWN 100 and (2) is included within a corresponding at least one other mobile wireless network, respectively, e.g., eNodeB 140 in NIB 106 of MMWN 116, eNodeB 140 in NIB 106 of MMWN 122, etc. Aspects of loop 213 are illustrated in more detail below in the context of FIG. 2C.

If the outcome of decision block 214 is yes (there has been a change in location of the $i^{th}$ other mobile network entity), then flow proceeds to block 216, where the adjustment-flag is set. From block 216, flow proceeds to decision block 218. If the outcome of decision block 214 is no (there has NOT been a change in neighbor-eNodeB location), then flow loops until eventually proceeding to iterative loop 217.

In iterative loop 217, which iterates for through a range i={0, . . . , N−1}, where N is the number of other mobile network entities, flow proceeds to decision block 218. At decision block 218, processor 108 continues to operate on the peer-data to determine if there has been a change in neighbor-status of the $i^{th}$ other mobile network entity that is included within at least one other mobile wireless network, respectively, e.g., eNodeB 140 in NIB 106 of MMWN 116, eNodeB 140 in NIB 106 of MMWN 122, etc. Aspects of loop 217 are illustrated in more detail below in the context of FIG. 2D.

If the outcome of decision block 218 is yes (there has been a change in neighbor-status of at least one other mobile network entity), then flow proceeds to block 220, where the adjustment-flag is set. From block 220, flow proceeds to decision block 222. If the outcome of decision block 218 is no (there has NOT been a change in neighbor-status of another eNodeB), then flow loops until eventually proceeding to decision block 222.

At decision block 222, processor 108 determines if the adjustment-flag has been set. If so (yes, the adjustment-flag has been set), then flow proceeds to block 224. But if the outcome of decision block 222 is no (the adjustment-flag has NOT been set), then flow proceeds to loop back to decision block 202.

At block 224, processor 108 adjusts one or more aspects which affect how the first mobile network entity (e.g., eNodeB 140) and/or its companion second mobile network entity (e.g., EPC 142) performs cellular-data communication according to the one or more satisfied conditions, respectively. Examples of adjustments performed by block 224 are illustrated in more detail below in the context of FIGS. 2E-2J, respectively. From block 224, flow proceeds to loop back to decision block 202.

FIGS. 2B-2J illustrate (in more detail, as noted above) aspects of the method of FIG. 2A, according to embodiments of the present invention, respectively.

Figure 2B:
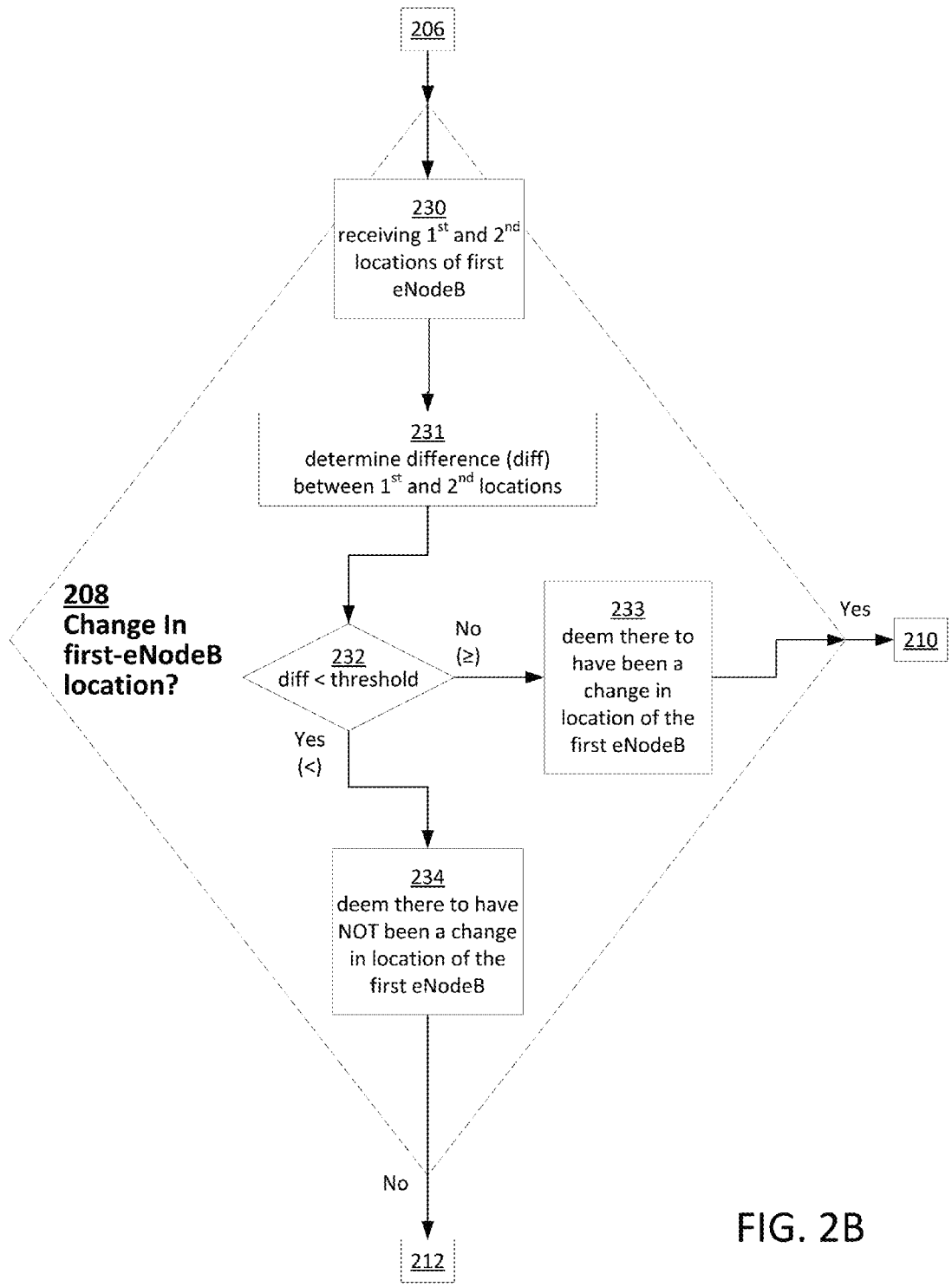

As noted above, the determination represented by decision block 208 of FIG. 2A is illustrated in more detail in the context of FIG. 2B.

In FIG. 2B, flow enters decision block 208 and proceeds to block 230, where processor 108 receives first and second locations of eNodeB 140 in MMWN 100. Flow proceeds from block 230 to block 231, where processor 108 determines the difference (diff) between the first and second locations. From block 231, flow proceeds to decision block 232, where processor 108 determines if the difference is less than a threshold distance. If the outcome of decision block 232 is no (the difference is NOT less than the threshold, i.e., the difference is equal to or greater than the threshold), then flow proceeds to block 233, where processor 108 deems there to have been a change in the location of eNodeB 140 in MMWN 100. From block 233, flow proceeds out of the "yes" exit of decision block 208 to block 210, where (as discussed above) the adjustment-flag is set. If the outcome of decision block 232 is yes (the difference IS less than the threshold), then flow proceeds to block 234, where processor 108 deems there to have NOT been a change in the location of eNodeB 140 in MMWN 100. From block 234, flow proceeds out of the "no" exit of decision block 208 to block 210, where (as discussed above) peer-data is received.

Figure 2C:
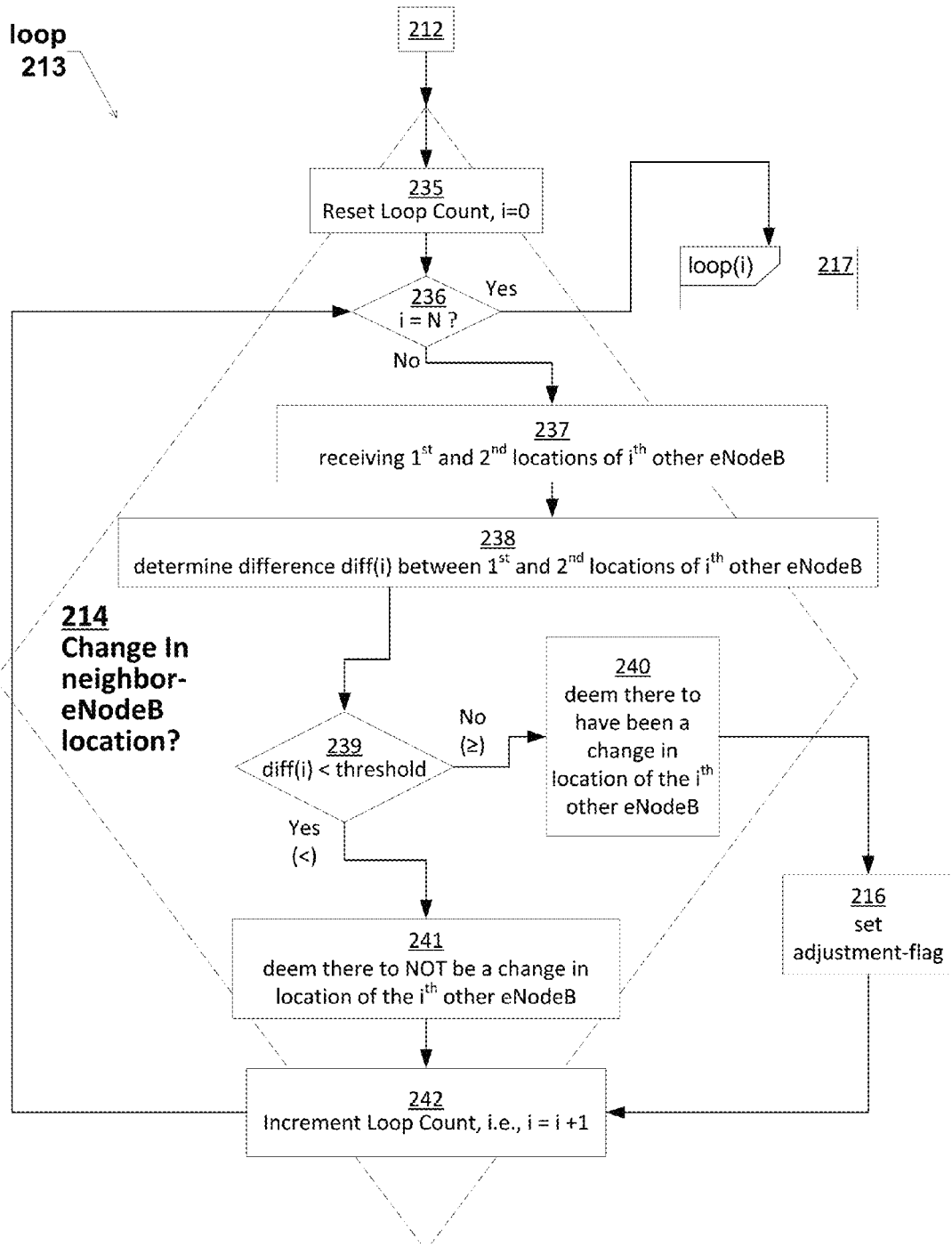

As noted above, aspects of loop 213 of FIG. 2A are illustrated in more detail in the context of FIG. 2C.

In FIG. 2C, flow enters loop 213 and proceeds to block 235, where a loop count (i) is reset (i=0). From block 235, flow proceeds to decision block 236, where processor 108 determines if i=N. If the outcome of decision block 236 is yes (i=N), then flow exits loop 213 and proceeds to loop 217. If the outcome of decision block 236 is no (i≠N), then flow proceeds to block 237, where processor 108 receives first and second locations of the $i^{th}$ other eNodeB that (1) has neighbor-status of yes relative to eNodeB 140 in MMWN 100 and (2) is included within a corresponding at least one other MMWN, respectively, e.g., eNodeB 140 in NIB 106 of MMWN 116, eNodeB 140 in NIB 106 of MMWN 122, etc. Flow proceeds from block 237 to block 238, where processor 108 determines the difference diff(i) between the first and second locations of the $i^{th}$ neighbor eNodeB 140. From block 238, flow proceeds to decision block 239, where processor 108 determines if the difference diff(i) is less than a threshold distance.

If the outcome of decision block 239 is no (the difference is NOT less than the threshold, i.e., the difference is equal to or greater than the threshold), then flow proceeds to block 240, where processor 108 deems there to have been a change in the location of the $i^{th}$ neighbor eNodeB 140. From block 240, flow proceeds to block 216, where (as discussed above) the adjustment-flag is set. From block 240, flow proceeds to block 242, where the loop count is incremented, i.e., i=i+1. From block 242, flow loops back to decision block 236 (discussed above).

If the outcome of decision block 239 is yes (the difference IS less than the threshold), then flow proceeds to block 241, where processor 108 deems there to have NOT been a change in the location of the $i^{th}$ neighbor eNodeB 140. From block 241, flow proceeds to block 242 (discussed above).

Figure 2D:
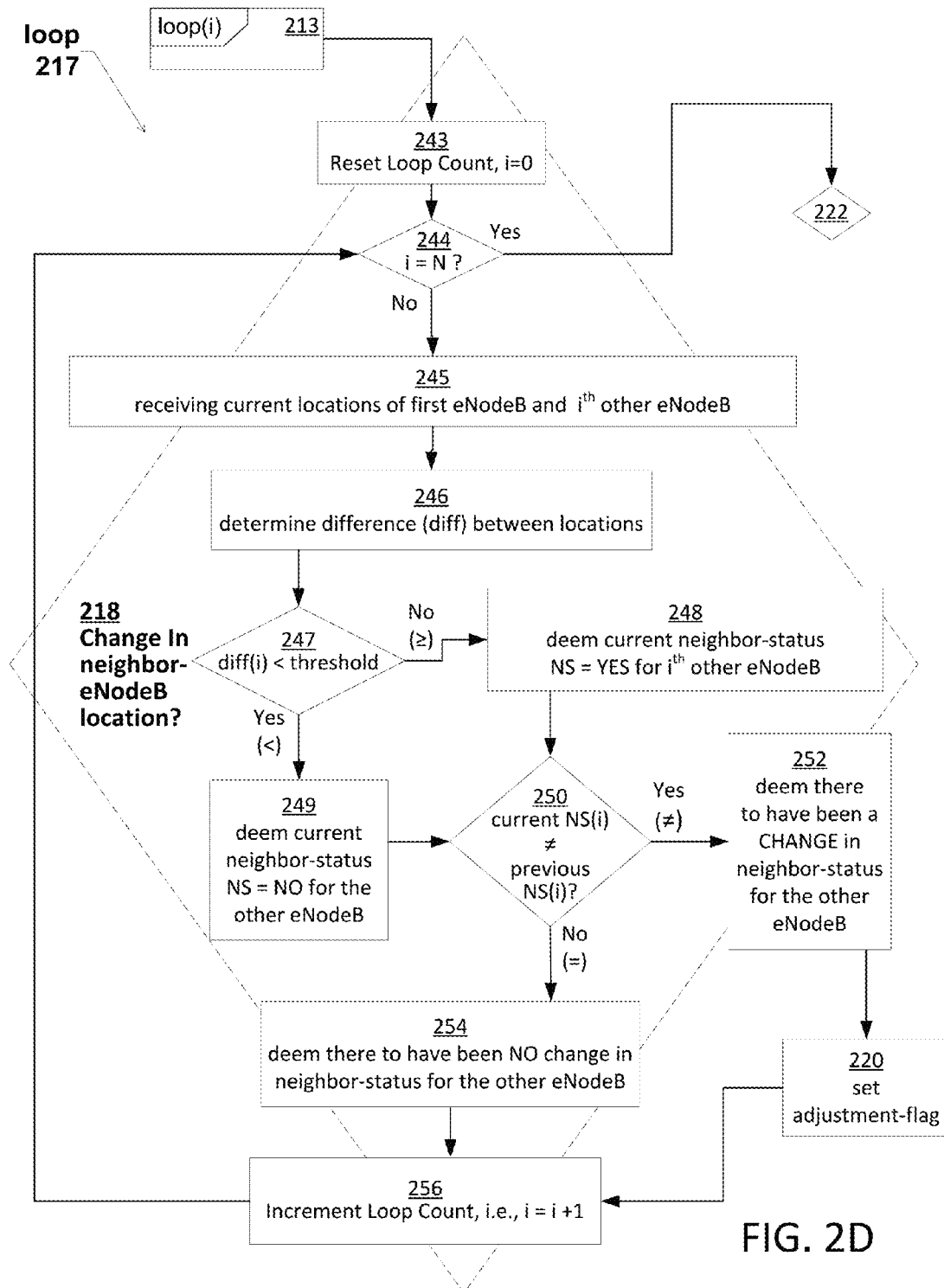

As noted above, aspects of loop 217 of FIG. 2A are illustrated in more detail in the context of FIG. 2D.

In FIG. 2D, flow enters loop 217 and proceeds to block 243, where a loop count (i) is reset (i=0). From block 243, flow proceeds to decision block 244, where processor 108 determines if i=N. If the outcome of decision block 244 is yes (i=N), then flow exits loop 217 and proceeds to decision block 222. If the outcome of decision block 244 is no (i≠N), then flow proceeds to block 245, where processor 108 receives current locations of the given mobile network entity and the $i^{th}$ other mobile network entity. From block 245, flow proceeds to block 246, where processor 108 determines the difference/distance diff(i) between the given mobile network entity and the $i^{th}$ other mobile network entity.

For example, processor 108 can calculate diff(i) according to a great-circle (or orthodromic) distance formula, e.g., one based on the Haversine formula. The great-circle distance is the shortest distance between two points on the surface of a sphere, measured along the surface of the sphere (as opposed to a straight line through the sphere's interior). The distance between two points in Euclidean space is the length of a straight line between them, but on the sphere there are no straight lines. In non-Euclidean geometry, straight lines are replaced with geodesics, where a geodesic is segment of a great circle (namely, a circle on the sphere whose center coincides with the center of the sphere). Through any two given points on a sphere which are not directly opposite each other, there is a unique great circle. The two given points separate the great circle into two arcs. The length of the shorter arc is the great-circle distance between the points.

From block 246, flow proceeds to decision block 247, where processor 108 determines if the difference diff(i) is less than a threshold distance. The threshold distance can be, e.g., the cell range (transmission range) of the given mobile network entity. There are multiple propagation loss models that can be used to calculate the cell range, e.g., the Free Space Model, the CCIR Model, the Hata Models, the Walfisch-Ikegami Models (WIM), etc. For example, processor 108 can calculate the cell range using the CCIR Path Loss Model ($L_{ccir}$), an empirical formula for the combined effects of free-space path loss and terrain-induced path loss as published by the CCIR (Comite' Consultatif International des Radio-Communication, now ITU-R), wherein:

$$R = P_t + G_{tot} - L \tag{1}$$

$$L_{ccir} = 69.55 + 26.16 \text{ Log}_{10}(f_{MHz}) - 13.82 \text{ Log}_{10}(h_b) - a(h_m) + [44.9 - 6.55 \text{ Log}_{10}(h_b)] \text{ Log}_{10}(d_{km}) - B \tag{2}$$

$$a(h_m) = [1.1 \text{ Log}_{10}(f_{MHz}) - 0.7]h_m - [1.56 \text{ Log}_{10}(f_{Mhz}) - 0.8] \tag{3}$$

and $$B = 30 - 25 \text{ Log}_{10}(\% \text{ of area covered by buildings}) \tag{4}$$

and wherein:
R=receiver sensitivity in dBm;
$P_t$=transmitter power in dBm;
$G_{tot}=(A_g-C_l)$ Total gain in dB;
$A_g$=total antenna gain in dB;
$C_l$=total connection loss in dB;
L=transmission path loss in dB;
d=distance in meters between transmitter and receiver;
$h_b$=base antenna height over street level in meters;
$h_m$=mobile station antenna height in meters; and
$h_B$=nominal height of building roofs in meters.

Substituting (2) into (1) and solving for distance yields the following CCIR maximum distance, $d_{ccir}$, equation:

$$d_{ccir} = \text{antiLog}_{10}\{[P_t + G_{tot} - R - 69.55 - 26.16 \text{ Log}_{10}(f_{MHz}) + 13.82 \text{ Log}_{10}(hb) + a(h_m) + B] / [44.9 - 6.55 \text{ Log}_{10}(h_b)]\}. \tag{5}$$

For example, if the following values are assumed, namely $P_t$=39 dBm, $G_{tot}$=7.5 dB, R=−95 dBm, $f_{MHz}$=2350, $h_b$=8 meters, $h_m$=1 meter and B=25% area covered by buildings; then the CCIR Path Loss Model ($L_{ccir}$) yields a maximum CCIR distance, $d_{ccir}$ 550 meters.

If the outcome of decision block 247 is no (the difference is NOT less than the threshold, i.e., the difference is equal to or greater than the threshold), then flow proceeds to block 248, where processor 108 deems the current neighbor-status (NS) to be NS=YES for the $i^{th}$ other mobile network entity. From block 248, flow proceeds to decision block 250 (discussed below). If the outcome of decision block 247 is yes (the difference IS less than the threshold), then flow proceeds to block 249, where processor 108 deems the current neighbor-status (NS) to be NS=NO for the $i^{th}$ other mobile network entity. From block 249, flow proceeds to decision block 250.

At decision block 250, processor 108 determines if the current neighbor-status of NS(i) is the same as the previous status of NS(i). If the outcome of decision block 250 is yes (current and previous are different), then flow proceeds to block 252, where processor 108 deems there to have been a change in the neighbor-status the $i^{th}$ neighbor mobile base. From block 252, flow proceeds to block 220, where (as discussed above) the adjustment-flag is set. From block 220, flow proceeds to block 256, where the loop count is incremented, i.e., i=i+1. From block 256, flow loops back to decision block 244 (discussed above).

If the outcome of decision block 250 is no (current and previous are the same), then flow proceeds to block 254, where processor 108 deems there to have been NO change in the neighbor-status the $i^{th}$ neighbor mobile base. From block 254, flow proceeds to block 256, where (as discussed above) the loop count is incremented, i.e., i=i+1. From block 256, flow loops back to decision block 244 (discussed above).

As noted above, examples of adjustments performed by block 224 of FIG. 2A are illustrated in more detail in the context of FIGS. 2E-2J, respectively.

Figure 2E:
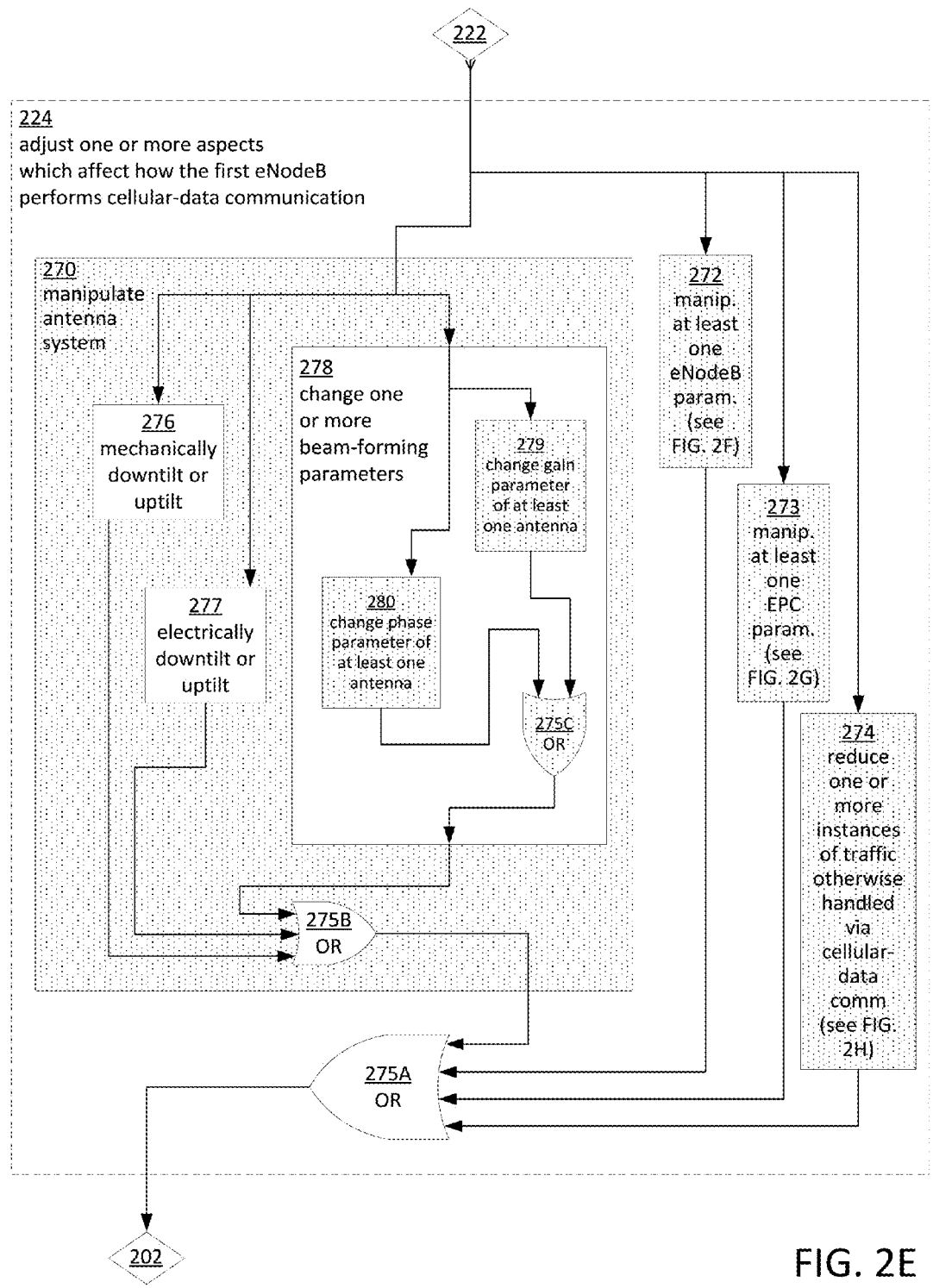

As discussed above, in block 224, processor 108 adjusts one or more aspects which affect how the first mobile network entity performs cellular-data communication according to the one or more satisfied conditions, respectively. In FIG. 2E, the examples of such adjustments include blocks 270, 272, 273 and 274.

Figure 2F:
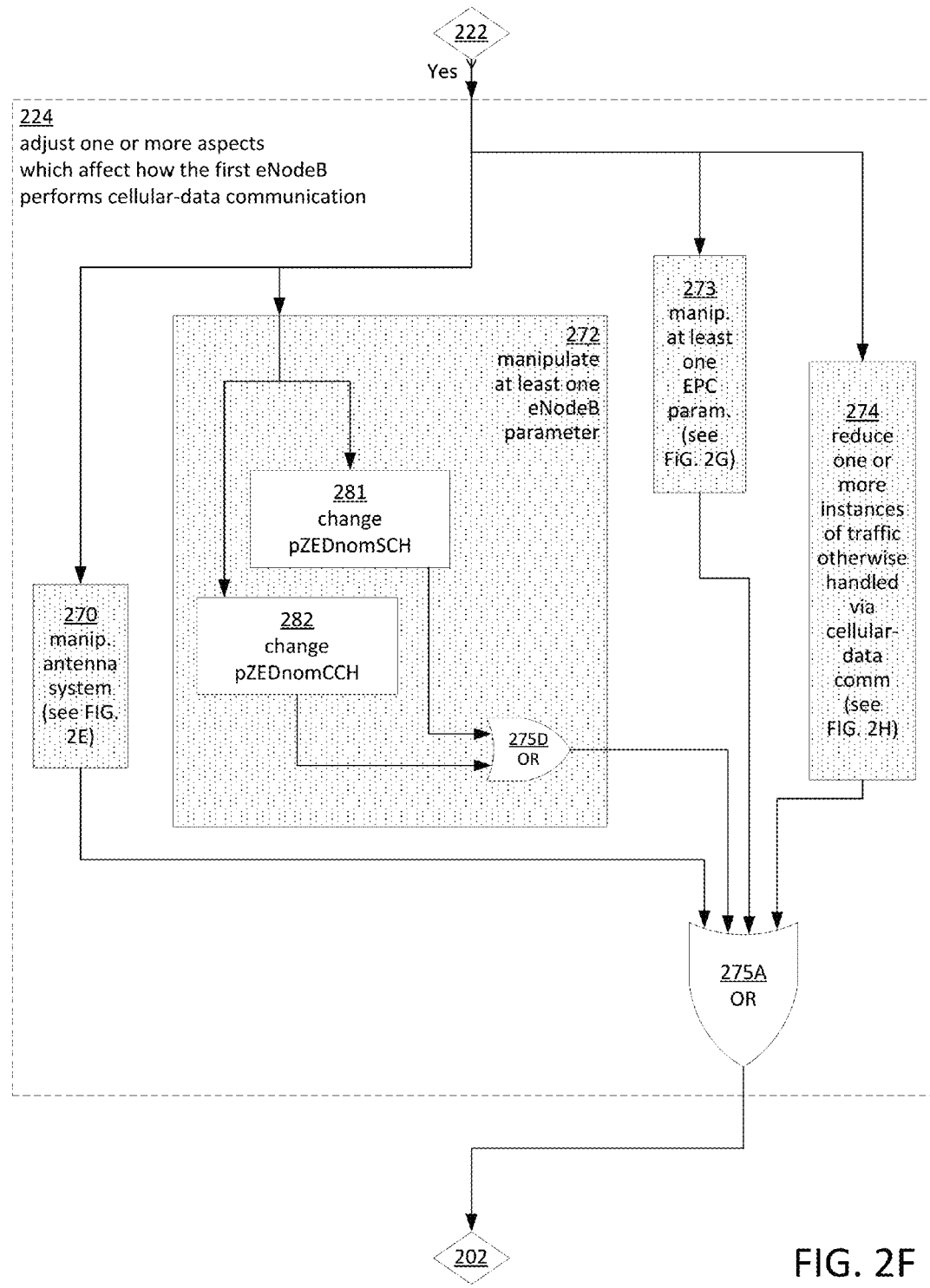
Figure 2G:
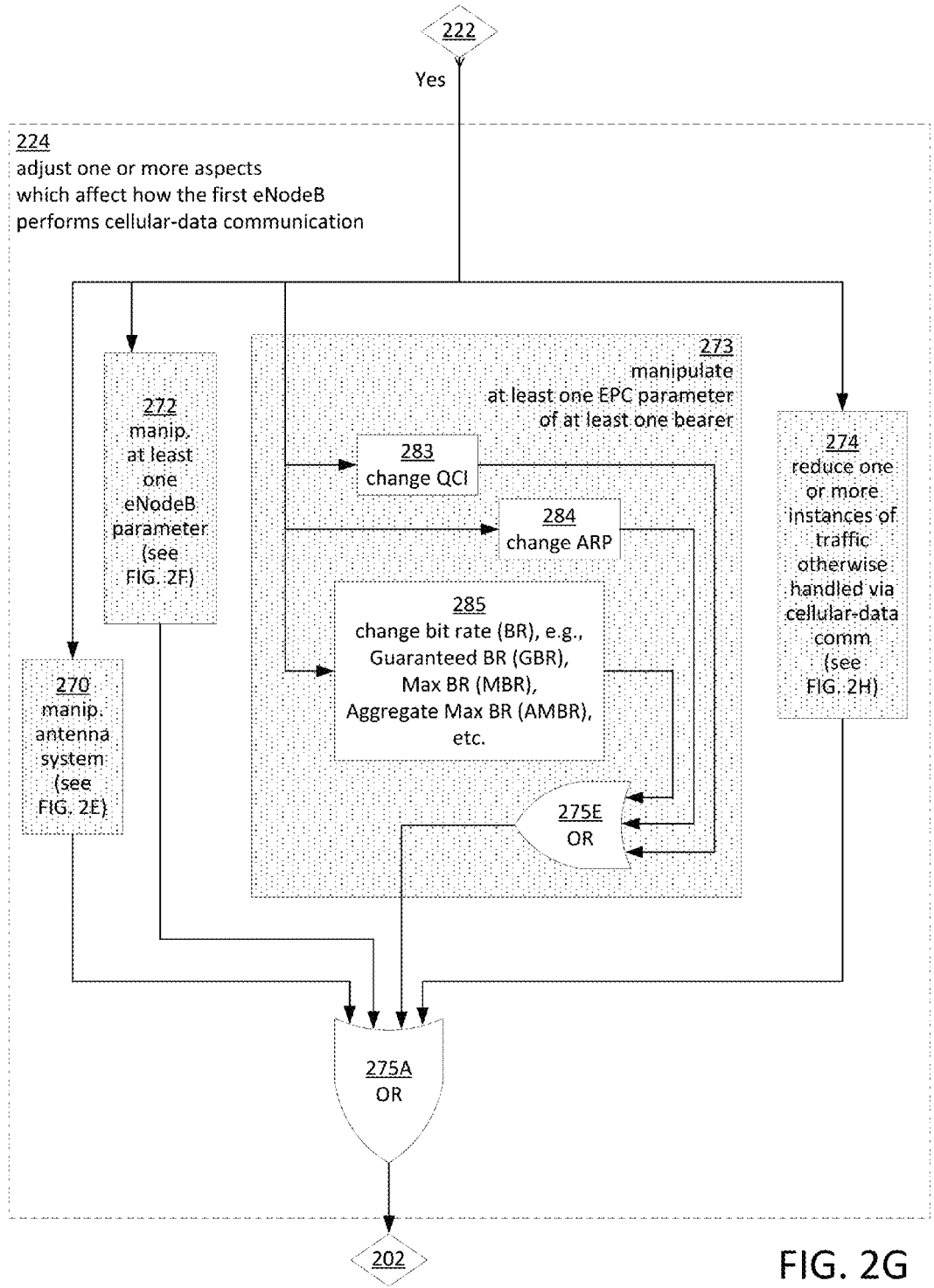

Amongst blocks 207-274: FIG. 2E provides details regarding the adjustment performed by block 270; FIG. 2F (discussed below) provides details regarding the adjustment performed by block 272; FIG. 2G (discussed below) provides details regarding the adjustment performed by block 273; and FIG. 2H (discussed below) provides details regarding the adjustment performed by block 274.

More particularly, blocks 270-274 of FIG. 2E represent adjustments that can be performed alone or in various combinations including: block 270 alone; block 272 alone; block 273 alone; block 274 alone; blocks 270 and 272; blocks 270 and 273; blocks 270 and 274; blocks 272 and 273; blocks 272 and 274; blocks 273 and 274; blocks 270, 272 and 273; blocks 270, 272 and 274; blocks 270, 273 and 274; blocks 272, 273 and 274; and blocks 270, 272 and 274. That is, none of blocks 270-274 is mutually exclusive to one or both of the other ones of blocks 270-274. Accordingly, flow in FIG. 2E is illustrated as entering block 224 from decision block 222 (as discussed above) and then diverging to proceed in parallel to one or more of blocks 270-274, and then proceeding from each of blocks 270-274 to a logical OR block 275A. Flow proceeds from logical OR block 275A to decision block 202 (discussed above).

As noted above, FIG. 2E focuses on block 270 amongst blocks 270-274. In block 270, processor 108 manipulates the antenna system of eNodeB 140 of the MMWN, e.g., MMWN 100, in order to adjust how the first mobile network entity performs cellular-data communication. Examples of antenna-system manipulations are provided by blocks 276, 277 and 278 that are included within block 270.

More particularly, blocks 276-278 represent antenna system manipulations that can be performed alone or in various combinations. That is, none of blocks 276-278 is mutually exclusive to one or both of the other ones of blocks 276-278. Accordingly, flow is illustrated as entering block 270 from decision block 222 (as discussed above) and then diverging to proceed in parallel to one or more of blocks 276-278, and then proceeding from each of blocks 276-278 to a logical OR block 275B. Flow proceeds from logical OR block 275B to logical OR block 275A (discussed above).

In block 276, processor 108 manipulates the corresponding antenna system by controlling the corresponding one or more instances of mechanical adjuster 158 (discussed above in the context of FIGS. 1C-1F) to mechanically down-tilt or up-tilt the corresponding one or more instances of antennas 156 (discussed above in the context of FIGS. 1C-1F). In block 277, processor 108 manipulates the corresponding antenna system by electrically down-tilting or up-tilting the radiation propagating from the one or more instances of antenna 156, respectively. As discussed above in the context of FIGS. 1C-1F, processor 108 can induce electrical down-tilt or up-tilt by manipulating the phases of the signals provided to the multiple elements of the corresponding one or more instances of antennas 156, respectively.

In block 278, processor 108 manipulates the corresponding antenna system by controlling the beam-forming performed by NIB 106. For the beam-forming manipulations of block 278 of FIG. 2E, it is assumed that eNodeB 140 of the MMWN, e.g., MMWN 100, is provided with at least two antenna systems so as to include at least two instances of antenna 156, e.g., where each instance of antenna 156 can be an omnidirectional antenna. More particularly, processor 108 controls such beam-forming by selectively changing one or more beam-forming parameters according to which are generated those signals which are provided to the multiple elements of the corresponding one or more instances of antennas 156, respectively.

Examples of beam-forming parameter manipulations are provided by blocks 279 and 280 that are included within block 278. Blocks 279-280 can be performed alone or in combination. That is, blocks 279-280 are not mutually exclusive to the other. Accordingly, flow is illustrated as entering block 278 from decision block 222 (as discussed above) and then diverging to proceed in parallel to one or both of blocks 279-280, and then proceeding from each of blocks 279-280 to a logical OR block 275C. Flow proceeds from logical OR block 275C to logical OR block 275B (discussed above).

In block 279, processor 108 manipulates a beam-forming parameter by changing, for given one of the at least one instance of antenna 156, a phase parameter according to which are generated the signals which are provided to given instance of antenna 156. In block 280, processor 108 manipulates a beam-forming parameter by changing, for given one of the at least one instance of antenna 156, a gain parameter according to which are generated the signals which are provided to given instance of antenna 156.

As noted above, more detail regarding the adjustment performed by block 272 of FIG. 2E is illustrated in the context of FIG. 2F. That is, among blocks 270-274, FIG. 2F focuses on block 272.

In block 272, processor 108 adjusts how the first mobile network entity performs cellular-data communication by manipulating at least one parameter of eNodeB 140 of the MMWN, e.g., MMWN 100. An example of an eNodeB-parameter manipulation is adjusting the overall radiation power of eNodeB 140. Additional examples of eNodeB-parameter manipulations are provided by blocks 281 and 282 that are included within block 272 of FIG. 2F.

More particularly, blocks 281-282 represent eNodeB-parameter manipulations that can be performed alone or in combination. That is, blocks 281 and 282 are not mutually exclusive to each other. Accordingly, flow is illustrated as entering block 272 from decision block 222 (as discussed above) and then diverging to proceed in parallel to one or both of blocks 281-282, and then proceeding from each of blocks 281-282 to a logical OR block 275D. Flow proceeds from logical OR block 275D to logical OR block 275A (discussed above).

In block 281, processor 108 manipulates an eNodeB-parameter by manipulating parameter p0 nominal pucch value (pZEDnomCCH). In block 282, processor 108 manipulates an eNodeB-parameter by manipulating parameter p0 nominal pusch value (pZEDnomSCH).

More detail regarding the eNodeB-parameter manipulations of block 272 of FIG. 2F is illustrated in the context of FIG. 23. For the sake of continuity of discussion, FIG. 23 will be discussed here, i.e., will be discussed before FIGS. 2H-2I are discussed (see below).

In FIG. 23, flow enters block 272 and proceeds to block 302, where processor 108 receives current locations of: the given mobile network entity, e.g., eNodeB 140 of the MMWN, e.g., MMWN 100; and N instances of UE 102 that are connected wirelessly to the given mobile network entity, respectively. From block 302, flow proceeds to block 304, where a loop count (i) is reset (i=0). From block 304, flow proceeds to decision block 306, where processor 108 determines if i=N. If the outcome of decision block 306 is yes (i=N), then flow exits block 272 and proceeds to decision block 202 (discussed above). If the outcome of decision block 306 is no (i≠N), then flow proceeds to block 308, where processor 108 determines the difference diff(i) between the given mobile network entity and the $i^{th}$ instance of UE 102 that is wirelessly connected to the given mobile network entity. From block 308, flow proceeds to decision block 310, where processor 108 determines if the difference diff(i) is less than a threshold distance.

If the outcome of decision block 310 is no (the difference is NOT less than the threshold, i.e., the difference is equal to or greater than the threshold), then flow proceeds to block 314, where processor 108 deems the current proximity-status (PS) to be PS=FAR for the $i^{th}$ instance of UE 102. From block 314, flow proceeds to decision block 316 (discussed below). If the outcome of decision block 310 is yes (the difference IS less than the threshold), then flow proceeds to block 312, where processor 108 deems the current proximity-status to be PS=NEAR for the $i^{th}$ instance of UE 102. From block 312, flow proceeds to decision block 316.

At decision block 316, processor 108 determines if the proximity-status of the $i^{th}$ instance of UE 102 is NEAR, i.e., if PS(i)=NEAR. If the outcome of decision block 316 is no (PS(i)≠NEAR), then flow exits the loop without adjusting any eNodeB parameters, with flow proceeding to block 202 (discussed above).

If, however, the outcome of decision block 316 is yes (PS(i)=NEAR), then flow proceeds to decision block 318, where processor 108 determines if i=(N−1), i.e., if this is the last iteration of the loop such that the proximity-status for all N instances of UE 102 has been determined. If the outcome of decision block 318 is no (i≠(N−1)), then flow proceeds to block 322, where the loop count is incremented, i.e., i=i+1. From block 322, flow loops back to decision block 306 (discussed above) in order to iterate the loop.

If the outcome of decision block 318 is yes (i=(N−1)), then proceeds to block 320, where processor 108 changes one or more eNodeB parameters, e.g., see blocks 281-282 of FIG. 2F (discussed above). From block 320, flow proceeds to block 322, where the loop count is incremented, i.e., i=i+1, with the result that i=N. From block 322, flow loops back to decision block 306 (discussed above), where the decision-outcome will be to exit block 272 (because i=N) and proceed to decision block 202 (discussed above).

As noted above, more detail regarding the adjustment performed by block 273 of FIG. 2E is illustrated in the context of FIG. 2G. That is, among blocks 270-274, FIG. 2G focuses on block 273.

In block 273, processor 108 adjusts how the first mobile network entity performs cellular-data communication by manipulating at least one parameter of EPC 142 of the MMWN, e.g., MMWN 100. An example of an EPC-parameter manipulation is adjusting one of the parameters that are used to control a given bearer (a virtual connection) supported via EPC 142. Additional examples of EPC-parameter manipulations are provided by blocks 283, 284 and 285 that are included within block 273 of FIG. 2G. More particularly, blocks 283-85 represent EPC-parameter manipulations that can be performed alone or in combination. That is, blocks 283, 284 and 285 are not mutually exclusive to each other. Accordingly, flow is illustrated as entering block 272 from decision block 222 (as discussed above) and then diverging to proceed in parallel to one or more of blocks 283-285, and then proceeding from each of blocks 283-285 to a logical OR block 275E. Flow proceeds from logical OR block 275E to logical OR block 275A (discussed above).

In block 283, processor 108 manipulates an EPC-parameter by manipulating quality of service (QOS) class identifier (QCI). In block 284, processor 108 manipulates an EPC-parameter by manipulating allocation and retention priority parameter (ARP). In block 285, processor 108 manipulates an EPC-parameter by manipulating one or more bit rate parameters, e.g., guaranteed bit rate (GBR), maximum bit rate (MBR), aggregate maximum bit rate (AMBR) (in the circumstance of a non-GBR bearer), etc.

Figure 2H:
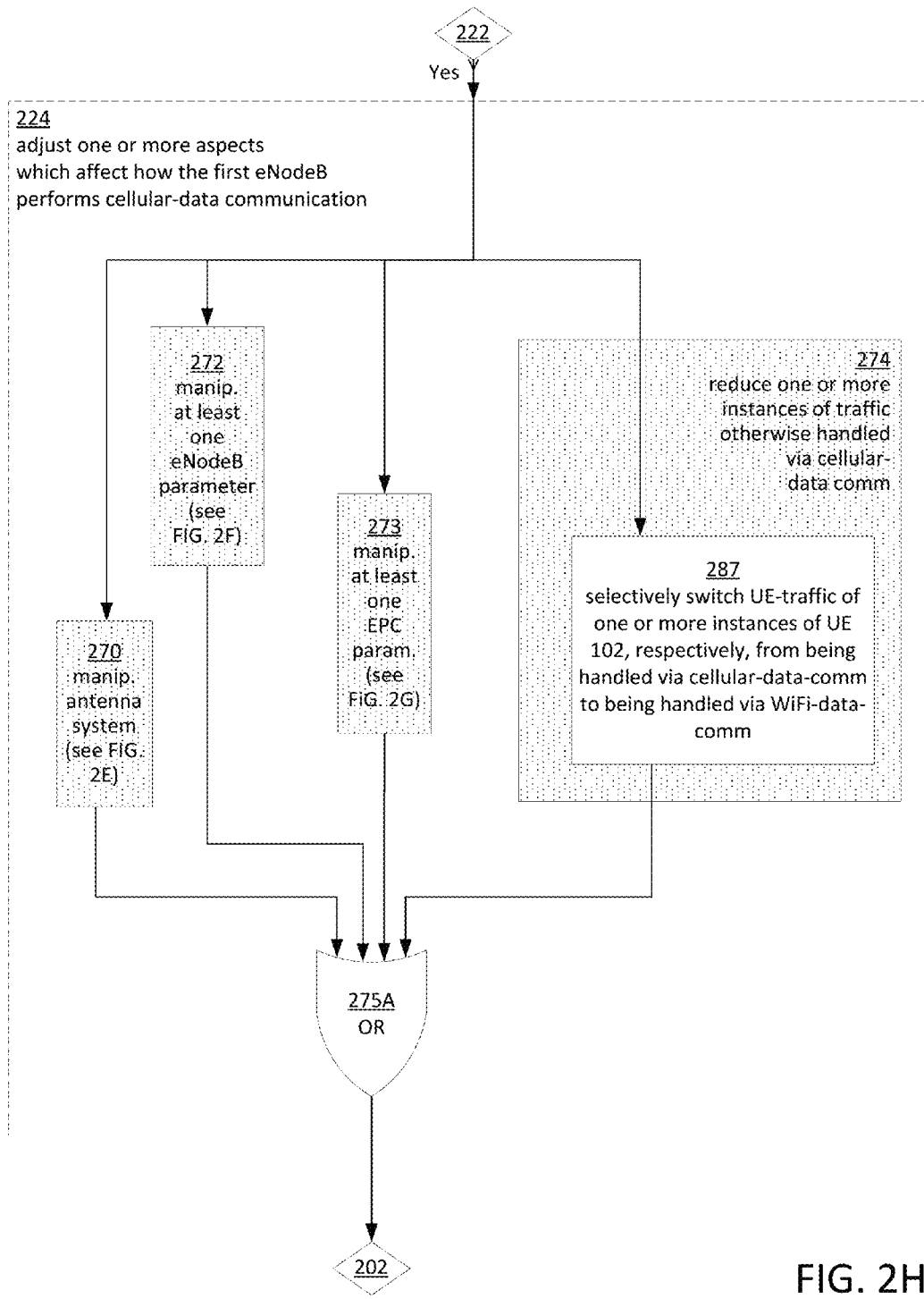
Figure 21:
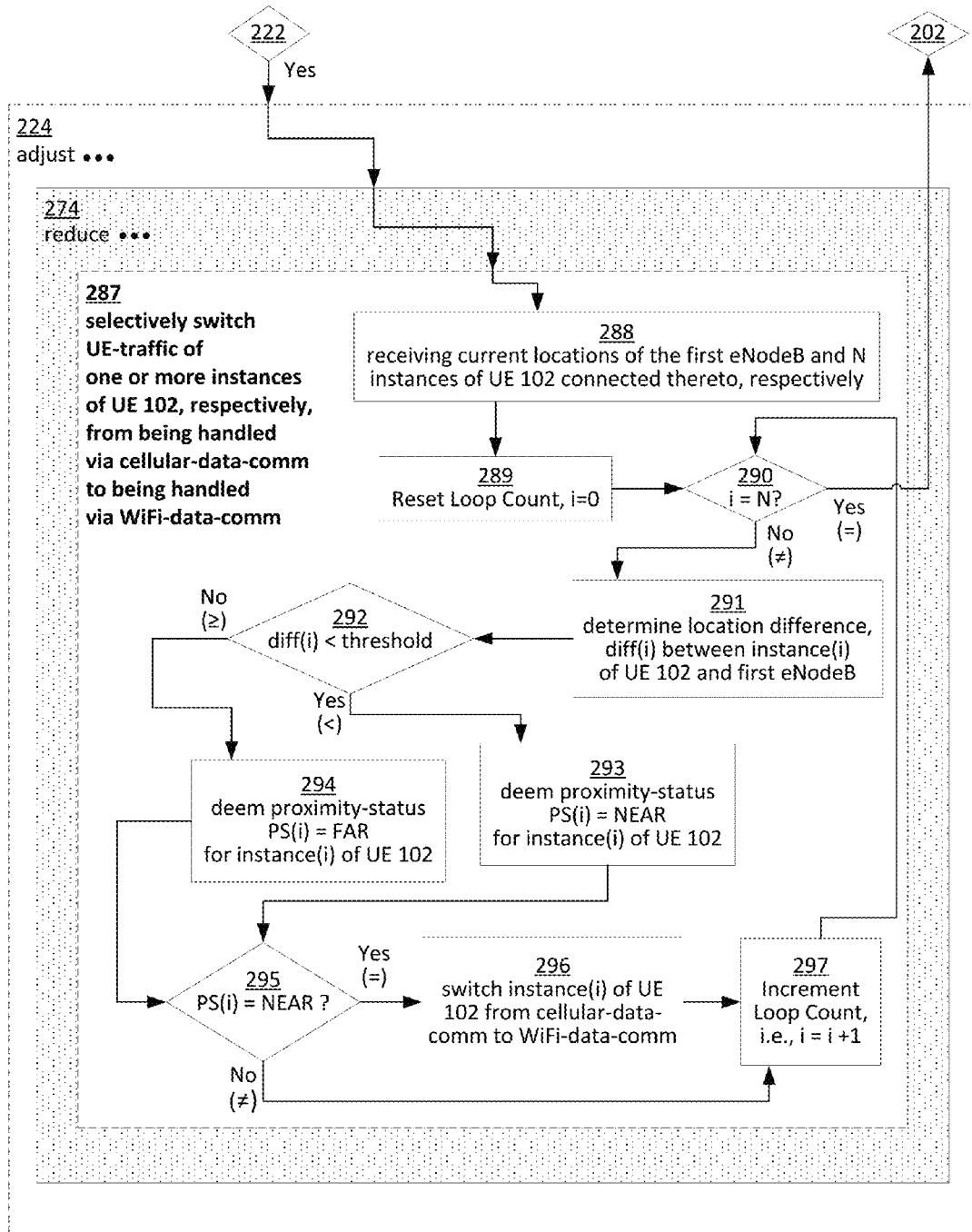
Figure 2J:
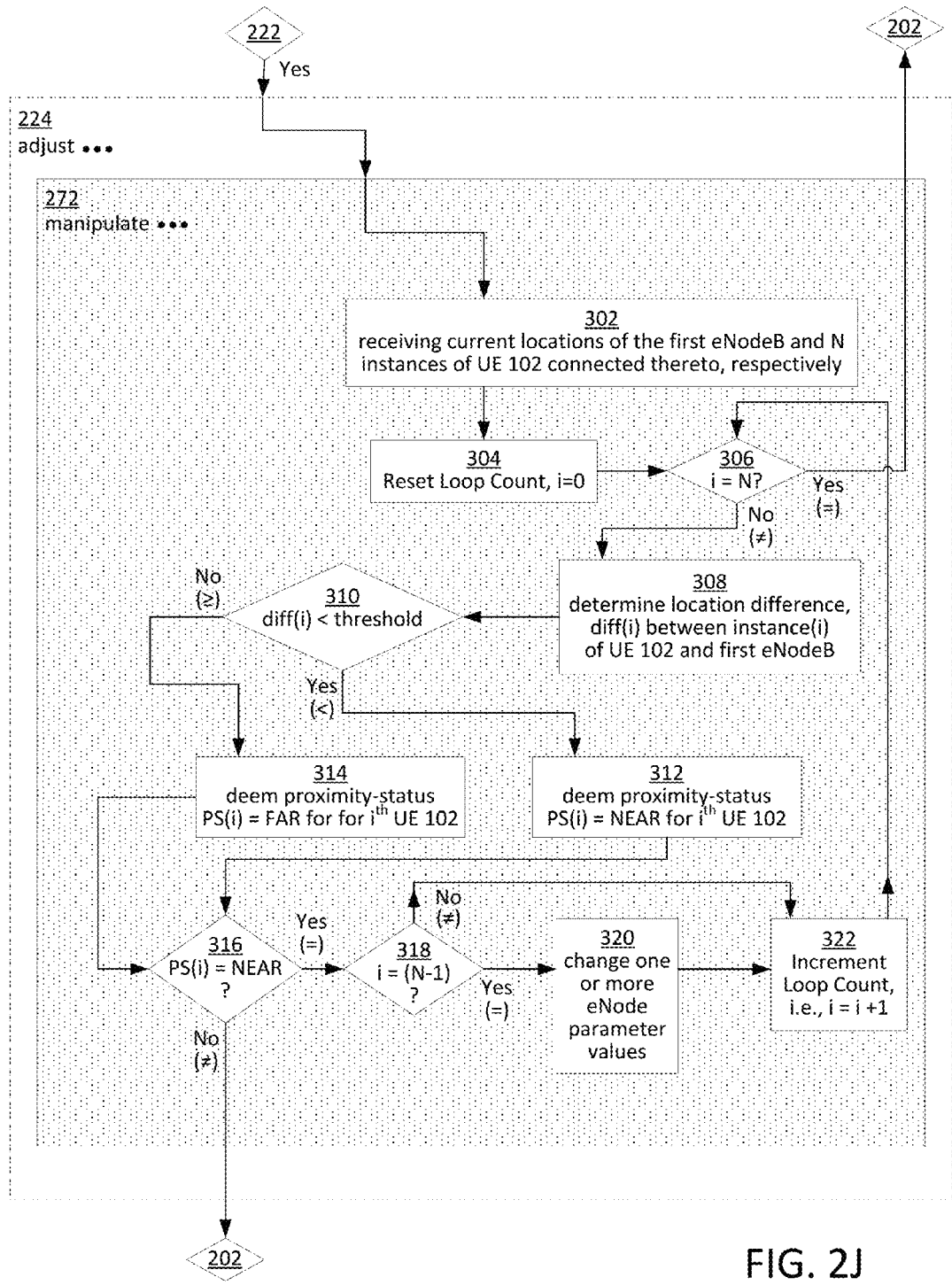

As noted above, more detail regarding the adjustment performed by block 274 of FIG. 2E is illustrated in the context of FIG. 2H. That is, among blocks 270-274, FIG. 2H focuses on block 274.

In block 274, processor 108 adjusts how the first mobile network entity performs cellular-data communication by reducing one or more instances of traffic that are otherwise handled via cellular-data-communication. An example of how one or more instances of such traffic are reduced is provided by block 287 that is included within block 274.

In block 287, processor 108 reduces one or more instances of such traffic by selectively switching UE-traffic of one or more instances of UE 102, respectively, from being handled via cellular-data-communication to being handled via WiFi-data-communication. For example, processor 108 can selectively switch of given instance of UE-traffic from being handled via cellular-data-communication using the LTE modem (not illustrated) within eNodeB 140 to being handled via WiFi-data-communication using the WiFi modem (not illustrated) within WiFi interface 144 of NIB 106.

More detail regarding the selective switch performed by block 287 of FIG. 2H is illustrated in the context of FIG. 2I.

In FIG. 2I, flow enters block 287 and proceeds to block 288, where processor 108 receives current locations of: the given mobile network entity, e.g., eNodeB 140 of the MMWN, e.g., MMWN 100; and N instances of UE 102 that are connected wirelessly to the given mobile network entity, respectively. From block 288, flow proceeds to block 289, where a loop count (i) is reset (i=0). From block 289, flow proceeds to decision block 290, where processor 108 determines if i=N. If the outcome of decision block 290 is yes (i=N), then flow exits block 287 and proceeds to decision block 202 (discussed above). If the outcome of decision block 290 is no (i≠N), then flow proceeds to block 291, where processor 108 determines the difference diff(i) between the given mobile network entity and the $i^{th}$ instance of UE 102 that is wirelessly connected to the given mobile network entity. From block 291, flow proceeds to decision block 292, where processor 108 determines if the difference diff(i) is less than a threshold distance.

If the outcome of decision block 292 is no (the difference is NOT less than the threshold, i.e., the difference is equal to or greater than the threshold), then flow proceeds to block 294, where processor 108 deems the current proximity-status (PS) to be PS=FAR for the $i^{th}$ instance of UE 102. From block 294, flow proceeds to decision block 295 (discussed below). If the outcome of decision block 292 is yes (the difference IS less than the threshold), then flow proceeds to block 293, where processor 108 deems the current proximity-status to be PS=NEAR for the $i^{th}$ instance of UE 102. From block 293, flow proceeds to decision block 295.

At decision block 295, processor 108 determines if the proximity-status of the $i^{th}$ instance of UE 102 is NEAR, i.e., if PS(i)=NEAR. If the outcome of decision block 295 is yes (PS(i)=NEAR), then flow proceeds to block 296, where processor 108 switches the UE-traffic for the $i^{th}$ instance of UE 102 from being handled via cellular-data-communication to being handled via WiFi-data-communication. From block 297, where the loop count is incremented, i.e., i=i+1. From block 297, flow loops back to decision block 290 (discussed above). If the outcome of decision block 295 is no (PS(i)≠NEAR), then flow proceeds to block 297 (discussed above).

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of methods of dynamically configuring a mobile network entity and corresponding dynamically configurable mobile network entities, those skilled in the art will appreciate that the mechanism of the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A method of dynamically configuring a first mobile network entity that is an evolved node B (eNodeB) or an evolved packet core (EPC), and which is included in a first mobile mobile-wireless network (MMWN), the method comprising:
    recognizing that one or more of the following conditions have been satisfied:
        a change in location of the first mobile network entity;
        a change in location of at least one other mobile network entity that (1) has neighbor-status of yes relative to the first MMWN and (2) is included within a corresponding at least one other MMWN, respectively; and
        a change in neighbor-status of at least one other mobile network entity that is included within at least one other MMWN, respectively; and
    adjusting, at the first mobile network entity, one or more aspects which affect how the first mobile network entity performs cellular-data communication according to the one or more satisfied conditions, respectively,
    wherein, in response to the first mobile network entity being an eNodeB, the adjusting one or more aspects which affect how the first mobile network entity performs cellular-data communication includes:
        receiving current locations of the first mobile network entity and instances of user equipment connected wirelessly to the first mobile network entity, respectively;
        determining differences between the locations of the first mobile network entity and each instance of user equipment, respectively;
        comparing the differences to a threshold;
        deeming each instance of user equipment to have a current proximity-status of NEAR or FAR based on the comparisons, respectively;
        in response to determining all instances of user equipment have current proximity-statuses of NEAR, manipulating at least one eNodeB parameter of the first mobile network entity; and
        operating the first mobile network entity in accordance with the manipulated at least one eNodeB parameter; and
    wherein the at least one eNodeB parameter includes at least one of p0 nominal pucch value (pZEDnomCCH), and p0 nominal pusch value (pZEDnomSCH).

2. The method of claim 1, further comprising:
    receiving peer data for at least one other MMWN;
    wherein, for each of the at least one other MMWN, the peer data includes:
        an access point name (APN);
        a public land mobile network (PLMN) identifier;
        cellular-data communication operation parameter values;
        location data regarding a mobile network entity corresponding to a respective one of the at least one other MMWN; and
        data regarding users of instances of user equipment being serviced by the mobile network entity; and
    wherein the recognizing is performed at least in part according to the peer data.

3. The method of claim 1, wherein the recognizing of a change in location of the first mobile network entity includes:
    receiving first and second locations of the first mobile network entity;
    determining a difference between the first and second locations;
    comparing the difference to a threshold; and
    deeming, in response to the comparing, the location of the first mobile network entity to have changed when the difference exceeds the threshold.

4. The method of claim 1, wherein the recognizing of a change in location of the at least one other mobile network entity, included in a given other MMWN, includes:
    receiving first and second locations of the at least one other mobile network entity;
    determining a difference between the first and second locations;
    comparing the difference to a threshold; and
    deeming there to be a change in location of the at least one other mobile network entity when the difference exceeds the threshold.

5. The method of claim 1, wherein the recognizing a change in neighbor-status of the at least one other mobile network entity, included in a given other MMWN, includes:
    receiving current locations of the first mobile network entity and the at least one other mobile network entity, respectively;
    determining a difference between the locations of the first mobile network entity and the at least one other mobile network entity;
    comparing the difference to a threshold; and
    deeming the other mobile network entity to have a current neighbor-status of yes or no based on the comparison; and
    deeming there to be a change in neighbor-status of the at least one other mobile network entity if the previous neighbor-status thereof is different from the current neighbor-status thereof or if there was no previous neighbor-status thereof.

6. The method of claim 1, wherein the adjusting one or more aspects which affect how the first mobile network entity performs cellular-data communication includes:
  manipulating an antenna system of the first mobile network entity.

7. The method of claim 6, wherein the manipulating of the antenna system includes at least one of:
  mechanically down-tilting or up-tilting the antenna system;
  electrically down-tilting or up-tilting the antenna system; and
  changing one or more beam-forming parameters of the antenna system.

8. The method of claim 7, wherein:
  the first mobile network entity includes multiple omnidirectional antennas each respectively configured to implement a change with respect to one or more of
    at least one gain parameter; and
    at least one phase parameter.

9. The method of claim 1, wherein:
  in response to the first mobile network entity being an evolved packet core (EPC),
  the adjusting one or more aspects which affect how the EPC performs cellular-data communication includes manipulating at least one EPC parameter of the EPC.

10. The method of claim 9, wherein the manipulating at least one EPC parameter of the EPC includes:
  changing, for at least one bearer, at least one of the following parameters:
  quality of service (QOS) class identifier (QCI);
  allocation and retention priority (ARP);
  guaranteed bit rate (GBR);
  maximum bit rate (MBR); and
  aggregate maximum bit rate (AMBR).

11. The method of claim 1, wherein:
  an instance of user-equipment (UE) traffic (UE-traffic) includes substantially all data transferred at a given moment during a wireless communication session between a given instance of user equipment and the first mobile network entity; and
  the adjusting one or more aspects which affect how the first mobile network entity performs cellular-data communication includes:
    reducing one or more instances of traffic that are otherwise handled via cellular-data-communication.

12. The method of claim 11, wherein the reducing includes:
  selectively switching UE-traffic of the one or more instances of user equipment, respectively, from being handled via cellular-data-communication to being handled via WiFi-data-communication.

13. The method of claim 12, wherein the selectively switching includes:
  receiving current locations of the first mobile network entity and instances of user equipment connected wirelessly to the first mobile network entity, respectively;
  determining differences between the locations of the first mobile network entity and each instance of user equipment, respectively;
  comparing the differences to a threshold;
  deeming each instance of user equipment to have a current proximity-status of NEAR or FAR based on the comparisons, respectively; and
  choosing to switch the UE-traffic of the one or more instances of user equipment from being handled via cellular-data-communication to being handled via WiFi-data-communication when a corresponding instance of user equipment has a current proximity-status of NEAR.

14. A dynamically configurable first mobile network entity that is an evolved node B (eNodeB) or an evolved packet core (EPC), and which is included in a first mobile mobile-wireless network (MMWN), the first mobile network entity comprising:
  a processor; and
  memory including program code;
  the processor being configured to execute the program code and thereby:
    recognize that one or more of the following conditions have been satisfied:
      a change in location of the first mobile network entity;
      a change in location of at least one other mobile network entity that (1) has neighbor-status of yes relative to the first MMWN and (2) is included within a corresponding at least one other MMWN, respectively; and
      a change in neighbor-status of at least one other mobile network entity that is included within at least one other MMWN, respectively; and
    adjust, through execution of the code at the first mobile network entity, one or more aspects which affect how the first mobile network entity performs cellular-data communication according to the one or more satisfied conditions, respectively,
  wherein, in response to the first mobile network entity being an evolved node B (eNodeB), the processor is further configured to adjust one or more aspects which affect how the first mobile network entity performs cellular-data communication by at least:
    receiving current locations of the first mobile network entity and instances of user equipment connected wirelessly to the first mobile network entity, respectively;
    determining differences between the locations of the first mobile network entity and each instance of user equipment, respectively;
    comparing the differences to a threshold;
    deeming each instance of user equipment to have a current proximity-status of NEAR or FAR based on the comparisons, respectively;
    in response to determining all instances of user equipment have current proximity-statuses of NEAR, manipulating at least one eNodeB parameter of the first mobile network entity; and
    operating the first mobile network entity in accordance with the manipulated at least one eNodeB parameter; and
  wherein the at least one eNodeB parameter includes at least one of p0 nominal pucch value (pZEDnomCCH), and p0 nominal pusch value (pZEDnomSCH).

15. The first mobile network entity of claim 14, wherein:
  the processor is further configured to at least receive peer data for at least one other MMWN;
  the peer data, for each of the at least one other MMWN, including:
    an access point name (APN);
    a public land mobile network (PLMN) identifier;
    cellular-data communication operation parameter values;

location data regarding a mobile network entity corresponding to a respective one of the at least one other MMWN; and data regarding users of instances of user equipment being serviced by the mobile network entity; and the processor is yet further configured to at least perform the recognition at least in part according to the peer data.

16. The first mobile network entity of claim 14, wherein, to recognize a change in location of the first mobile entity, the processor is further configured to at least:
receive first and second locations of the first mobile network entity;
determine a difference between the first and second locations;
compare the difference to a threshold; and
deem, in response to the comparing, the location of the first mobile network entity to have changed when the difference exceeds the threshold.

17. The first mobile network entity of claim 14, wherein, to recognize a change in location of the at least one other mobile network entity included in a given other MMWN, the processor is further configured to at least:
receive first and second locations of the at least one other mobile network entity;
determine a difference between the first and second locations;
compare the difference to a threshold; and
deem there to be a change in location of the at least one other mobile network entity when the difference exceeds the threshold.

18. The first mobile network entity of claim 14, wherein, to recognize a change in neighbor-status of the at least one other mobile network entity included in a given other MMWN, the processor is further configured to at least:
receive current locations of the first mobile network entity and the at least one other mobile network entity, respectively;
determine a difference between the locations of the first mobile network entity and the at least one other mobile network entity;
compare the difference to a threshold;
deem the other mobile network entity to have a current neighbor-status of yes or no based on the comparison; and
deem there to be a change in neighbor-status of the at least one other mobile network entity if the previous neighbor-status thereof is different from the current neighbor-status thereof or if there was no previous neighbor-status thereof.

19. The first mobile network entity of claim 14, further comprising:
an antenna system; and
wherein the processor is further configured to adjust one or more aspects which affect how the first mobile network entity performs cellular-data communication by at least:
manipulating the antenna system of the first mobile network entity.

20. The first mobile network entity of claim 19, further comprising:
a mechanical adjuster to adjust an angle of inclination of the antenna system relative to an imaginary horizontal reference plane; wherein:
the processor is further configured to manipulate the antenna system by doing at least one of the following:
controlling the mechanical adjuster to mechanically down-tilt or up-tilt the antenna system;
electrically down-tilt or up-tilt the antenna system; and
changing one or more beam-forming parameters of the antenna system.

21. The first mobile network entity of claim 20, wherein:
the antenna system includes multiple omnidirectional antennas each respectively configured to implement a change with respect to one or more of
at least one gain parameter; and
at least one phase parameter.

22. The first mobile network entity of claim 14, wherein:
in response to the first mobile network entity being an evolved packet core (EPC),
the processor is further configured to adjust one or more aspects which affect how the EPC performs cellular-data communication by at least:
manipulating at least one EPC parameter of the EPC.

23. The method of claim 22, wherein the processor is further configured to manipulate at least one EPC parameter of the EPC by at least:
changing, for at least one bearer, at least one of the following parameters:
quality of service (QOS) class identifier (QCI);
allocation and retention priority (ARP);
guaranteed bit rate (GBR);
maximum bit rate (MBR); and
aggregate maximum bit rate (AMBR).

24. The first mobile network entity of claim 14, wherein:
an instance of user-equipment (UE) traffic (UE-traffic) includes substantially all data transferred at a given moment during a wireless communication session between a given instance of user equipment and the first mobile network entity; and
the processor is further configured to adjust one or more aspects which affect how the first mobile network entity performs cellular-data communication by at least:
reducing one or more instances of traffic that are otherwise handled via cellular-data-communication.

25. The first mobile network entity of claim 24, wherein the processor is further configured to reduce one or more instances of traffic by at least:
selectively switching UE-traffic of the one or more instances of user equipment, respectively, from being handled via cellular-data-communication to being handled via WiFi-data-communication.

26. The first mobile network entity of claim 25, wherein the processor is further configured to selectively switch by at least:
receiving current locations of the first mobile network entity and instances of user equipment connected wirelessly to the first mobile network entity, respectively;
determining differences between the locations of the first mobile network entity and each instance of user equipment, respectively;
comparing the differences to a threshold; deeming each instance of user equipment to have a current proximity-status of NEAR or FAR based on the comparisons, respectively; and
choosing to switch the UE-traffic of the one or more instances of user equipment from being handled via cellular-data-communication to being handled via WiFi-data-communication when a corresponding instance of user equipment has a current proximity-status of NEAR.

* * * * *

UNITED STATES PATENT AND TRADEMARK OFFICE
CERTIFICATE OF CORRECTION

| | | |
|---|---|---|
| PATENT NO. | : 9,848,365 B2 | Page 1 of 1 |
| APPLICATION NO. | : 14/730391 | |
| DATED | : December 19, 2017 | |
| INVENTOR(S) | : Graffagnino et al. | |

It is certified that error appears in the above-identified patent and that said Letters Patent is hereby corrected as shown below:

On the Title Page

At (72): Change "Vincent Nathan Home, Frisco, TX (US)" to --Vincent Nathan Horne, Frisco, TX (US)--
Change "Steven Michael McCutchen, Southern Pines, TX (US)" to --Steven Michael McCutchen, Southern Pines, NC (US)--

Signed and Sealed this
Thirteenth Day of March, 2018

Andrei Iancu
*Director of the United States Patent and Trademark Office*